(12) United States Patent
Li et al.

(10) Patent No.: US 12,501,460 B2
(45) Date of Patent: *Dec. 16, 2025

(54) DATA SCHEDULING METHOD, BASE STATION, AND SYSTEM

(71) Applicant: HUAWEI TECHNOLOGIES CO., LTD., Guangdong (CN)

(72) Inventors: Chenwan Li, Beijing (CN); Yinghui Yu, Shenzhen (CN); Zhenglei Huang, Shenzhen (CN); Yan Wang, Beijing (CN); Baokun Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,246

(22) Filed: Jan. 17, 2023

(65) Prior Publication Data

US 2023/0180274 A1    Jun. 8, 2023

Related U.S. Application Data

(63) Continuation of application No. 16/028,588, filed on Jul. 6, 2018, now Pat. No. 11,632,788, which is a
(Continued)

(30) Foreign Application Priority Data

Jan. 7, 2016    (WO) ............... PCT/CN2016/070440

(51) Int. Cl.
*H04W 72/51* (2023.01)
*H04L 1/1829* (2023.01)
(Continued)

(52) U.S. Cl.
CPC .......... *H04W 72/51* (2023.01); *H04L 1/1854* (2013.01); *H04W 68/02* (2013.01); *H04W 72/1268* (2013.01); *H04W 76/10* (2018.02)

(58) Field of Classification Search
CPC . H04W 72/1268; H04W 76/10; H04W 68/02; H04W 72/51; H04L 1/1854
See application file for complete search history.

(56) References Cited

U.S. PATENT DOCUMENTS

| | | | |
|---|---|---|---|
| 6,983,147 B1 * | 1/2006 | Hans | H04L 27/368 455/439 |
| 10,721,775 B2 * | 7/2020 | Park | H04W 52/0216 |

(Continued)

FOREIGN PATENT DOCUMENTS

| | | |
|---|---|---|
| CN | 101179847 | 5/2008 |
| CN | 101360271 | 2/2009 |

(Continued)

OTHER PUBLICATIONS

3GPP TR 23. 720 V1 .2.0 (Nov. 2015), "3rd Generation Partnership Project; Technical Specification Group Services and System Aspects; Architecture enhancements for Cellular Internet of Things (Release 13)," Nov. 2015, 96 pages.

(Continued)

*Primary Examiner* — Mehmood B. Khan
(74) *Attorney, Agent, or Firm* — Fish & Richardson P.C.

(57) ABSTRACT

Example data scheduling methods and apparatus are described. One example method includes obtaining, by a base station, capability information of user equipment (UE). The first capability information is used to allocate a data scheduling resource for a data transmission of the terminal device, and the data transmission is through a control plane. The base station indicates allocated data scheduling resource to the terminal device. Then, the base station receives, on the data scheduling resource, a radio resource control connection (RRC) establishment complete signaling, where the RRC connection establishment complete signaling includes
(Continued)

a non-access stratum (NAS) message, and the NAS message includes data sent by the terminal device.

26 Claims, 8 Drawing Sheets

Related U.S. Application Data continuation of application No. PCT/CN2016/104793, filed on Nov. 4, 2016.

(51) Int. Cl.
  *H04W 68/02* (2009.01)
  *H04W 72/1268* (2023.01)
  *H04W 76/10* (2018.01)

(56) References Cited

U.S. PATENT DOCUMENTS

| | | | | |
|---|---|---|---|---|
| 2005/0047597 A1* | 3/2005 | Zheng | ............ | H04L 9/14 380/247 |
| 2009/0116468 A1* | 5/2009 | Zhang | ............ | H04W 72/51 370/342 |
| 2010/0098023 A1* | 4/2010 | Aghili | ............ | H04W 68/12 455/458 |
| 2010/0105386 A1* | 4/2010 | Guo | ............ | H04W 36/10 455/435.1 |
| 2010/0278037 A1* | 11/2010 | Jen | ............ | H04W 76/19 370/216 |
| 2011/0080894 A1* | 4/2011 | Iwamura | ............ | H04W 76/10 370/329 |
| 2011/0310820 A1* | 12/2011 | Liao | ............ | H04L 5/0094 370/329 |
| 2012/0002594 A1* | 1/2012 | Racz | ............ | H04B 7/15557 370/315 |
| 2012/0033635 A1 | 2/2012 | Tang et al. | | |
| 2012/0064892 A1 | 3/2012 | Kim | | |
| 2013/0303235 A1* | 11/2013 | Zheng | ............ | H04B 15/00 455/552.1 |
| 2013/0322413 A1 | 12/2013 | Pelletier et al. | | |
| 2013/0344866 A1 | 12/2013 | Guo | | |
| 2014/0003394 A1* | 1/2014 | Rubin | ............ | H04W 36/0033 370/331 |
| 2014/0094127 A1 | 4/2014 | Dimou et al. | | |
| 2014/0098756 A1 | 4/2014 | Tabatabaei Yazdi et al. | | |
| 2014/0161111 A1* | 6/2014 | Kim | ............ | H04W 56/0045 370/336 |
| 2014/0301370 A1* | 10/2014 | Sivavakeesar | .... | H04W 36/0005 370/331 |
| 2015/0078329 A1 | 3/2015 | Zhu et al. | | |
| 2015/0087287 A1 | 3/2015 | Pinheiro et al. | | |
| 2015/0110011 A1* | 4/2015 | Wei | ............ | H04L 5/0053 370/329 |
| 2015/0223028 A1* | 8/2015 | Wang | ............ | H04W 4/06 370/312 |
| 2016/0007213 A1* | 1/2016 | Cui | ............ | H04W 28/0215 370/230 |
| 2016/0183260 A1* | 6/2016 | Sriram | ............ | H04W 72/51 370/329 |
| 2016/0270028 A1* | 9/2016 | Lee | ............ | H04W 4/70 |
| 2016/0286524 A1* | 9/2016 | Griot | ............ | H04W 68/025 |
| 2016/0345119 A1* | 11/2016 | Futaki | ............ | H04W 24/04 |
| 2016/0366705 A1* | 12/2016 | Mujtaba | ............ | H04W 72/51 |
| 2016/0381720 A1* | 12/2016 | Baek | ............ | H04W 8/14 370/329 |
| 2017/0127325 A1* | 5/2017 | Vikberg | ............ | H04W 48/18 |
| 2017/0164135 A1* | 6/2017 | Kodaypak | ............ | H04W 4/70 |
| 2017/0181124 A1 | 6/2017 | Zhu et al. | | |
| 2017/0188280 A1* | 6/2017 | Watfa | ............ | H04W 36/12 |
| 2017/0208591 A1* | 7/2017 | Rico Alvarino | ........ | H04L 27/18 |
| 2017/0295567 A1* | 10/2017 | Chen | ............ | H04W 4/70 |
| 2017/0311326 A1* | 10/2017 | Wong | ............ | H04W 72/0453 |
| 2018/0007590 A1* | 1/2018 | Karout | ............ | H04W 76/10 |
| 2018/0206290 A1 | 7/2018 | Dai | | |
| 2018/0219652 A1* | 8/2018 | Chen | ............ | H04L 5/0091 |
| 2018/0270869 A1* | 9/2018 | Tsai | ............ | H04W 74/0833 |
| 2019/0021089 A1* | 1/2019 | Zhang | ............ | H04W 72/0453 |
| 2019/0037566 A1* | 1/2019 | Zhang | ............ | H04W 72/0453 |
| 2019/0215872 A1* | 7/2019 | Park | ............ | H04W 74/0833 |

FOREIGN PATENT DOCUMENTS

| | | |
|---|---|---|
| CN | 101547521 | 9/2009 |
| CN | 101610504 | 12/2009 |
| CN | 101860963 | 10/2010 |
| CN | 102045844 | 5/2011 |
| CN | 102223678 | 10/2011 |
| CN | 102447662 | 5/2012 |
| CN | 102487547 | 6/2012 |
| CN | 102740484 | 10/2012 |
| CN | 102761936 | 10/2012 |
| CN | 103428809 | 12/2013 |
| CN | 103686695 | 3/2014 |
| CN | 103731808 | 4/2014 |
| CN | 103907365 | 7/2014 |
| CN | 103974234 | 8/2014 |
| CN | 104640212 | 5/2015 |
| CN | 108260121 | 7/2018 |
| EP | 2487975 | 11/2014 |
| EP | 2640141 | 10/2017 |
| JP | 2013520102 | 5/2013 |
| WO | 2012136059 | 10/2012 |
| WO | 2015115981 | 8/2015 |

OTHER PUBLICATIONS

3GPP TS 23.003 V13.4.0 (Dec. 2015), "3rd Generation Partnership Project; Technical Specification Group Core Network and Terminals; Numbering, addressing and identification (Release 13)," Dec. 2015, 98 pages.

3GPP Ts 23.401 V13.5.0 (Dec. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)," Dec. 2015, 337 pages.

3GPP TS 36.212 V13.0.0 (Dec. 2015), "3rd Generation Partnership Project; Technical Specification Group Radio Access Network; Evolved Universal Terrestrial Radio Access (E-UTRA); Multiplexing and channel coding (Release 13)," Dec. 2015, 121 pages.

3GPP TS 36.213 V13.0.0 (Dec. 2015), "3rd Generation Partnership Project; Technical Specification Group Radio Access Network; Evolved Universal Terrestrial Radio Access (E-UTRA); Physical layer procedures (Release 13)," Dec. 2015, 326 pages.

3GPP TS 36.300 V12.8.0 (Dec. 2015), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Dec. 2015, 254 pages.

3GPP TS 36.306 V12.6.0 (Sep. 2015), "3rd Generation Partnership Project; Technical Specification Group Radio Access Network; Evolved Universal Terrestrial Radio Access (E-UTRA); User Equipment (UE) radio access capabilities (Release 12)," Sep. 2015, 45 pages.

3GPP TS 36.321 V12.8.0 (Dec. 2015), "3rd Generation Partnership Project; Technical Specification Group Radio Access Network; Evolved Universal Terrestrial Radio Access (E-UTRA); Medium Access Control (MAC) protocol specification (Release 12)," Dec. 2015, 77 pages.

3GPP TS 36.331 V12.8.0 (Dec. 2015), "3rd Generation Partnership Project; Technical Specification Group Radio Access Network; Evolved Universal Terrestrial Radio Access (E-UTRA); Radio Resource Control (RRC); Protocol specification (Release 12)," Dec. 2015, 456 pages.

3GPP TS 36.413 V13.1.0 (Dec. 2015), "3rd Generation Partnership Project; Technical Specification Group Radio Access Network; Evolved Universal Terrestrial Radio Access Network(E-UTRAN); S1 Application Protocol (S1AP) (Release 13)," Dec. 2015, 314 pages.

(56) References Cited

OTHER PUBLICATIONS

Alcatel-Lucent et al., "Response to R3-150966," 3GPP TSG RAN WG3 Meeting #88, R3-151181, Fukuoka, Japan, May 25-29, 2015, 3 pages.
CATT, "Capability Exchange and Criteria for Using Infrequent Small Data Optimization Method[online]," SA WG2 Temporary Document SA WG2 Meeting #94, S2-124355, Nov. 6, 2012, 11 pages.
Extended European Search Report issued in European Application No. 21203875.6 on Apr. 12, 2022, 11 pages.
HTC, "RRC aspects in NB-IOT," 3GPP TSG-RAN2 Meeting #92, R2-156425, Anaheim, USA, Nov. 16-20, 2015, 19 pages.
Huawei et al., "Further discussion on number of HARQ processes[online]," 3GPP TSG RAN WG1 Meeting #82bis, R1-155658, Sep. 25, 2015, 5 pages.
Huawei et al., "Solution for enhanced dedicated core network selection," SA WG2 Meeting #111, S2-153683, Chengdu, China, Oct. 19-23, 2015, 3 pages.
Huawei, "Clean up the FFS on subscription data handling during TAU and other procedures[online]," 3GPP TSG SA WG2 Architecture #60b, S2-075396, Nov. 8, 2007, 9 pages.
Japanese Notice of Reasons for Refusal issued in Japanese Application No. 2018-535368 on Apr. 10, 2019, 10 pages.
MCC, "Report of 3GPP TSG RAN WG3 meeting #88," TSG-RAN Working Group 3 meeting #89, R3-151324, Beijing, China, Aug. 24-28, 2015, 109 pages.
Motorola Mobility, "On evaluation of LTE-based Low-cost MTC UEs[online]," 3GPP TSG RAN WG1 #68, R1-120526, Feb. 2, 2012, 3 pages.
NEC, "[Resubmitted] Updates to Small Data connection release in clause 5.1.1.3.1 (solution 1)," SA WG2 Meeting #98, S2-132473, Valencia, Spain, Jul. 15-19, 2013, 8 pages.
Office Action issued in Chinese Application No. 201680003092.6 on Jul. 14, 2020, 15 pages (with English translation).
Office Action issued in Chinese Application No. 201680003092.6 on Nov. 6, 2019, 8 pages.
Office Action issued in Chinese Application No. 201710326025.4 on Apr. 2, 2020, 8 pages (with English translation).
Office Action issued in Chinese application No. 201710326025.4 on Sep. 19, 2019, 19 pages (With English Translation).
Office Action issued in Chinese Application No. 202110142439.8 on Jul. 6, 2022, 5 pages.
Office Action issued in Indian Application No. 201817026517 on Jun. 24, 2020, 6 pages.
Vodafone et al., "Status Report to TSG [online]," 3GPP TSG RAN Meeting #70, RP-151931, Dec. 1, 2015, 11 pages.

* cited by examiner

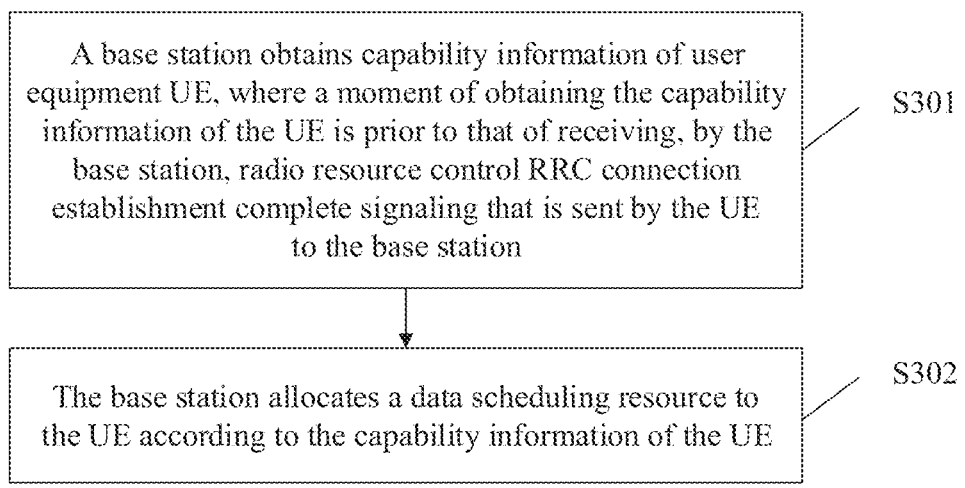
FIG. 3
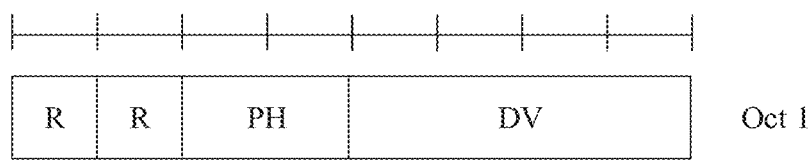
FIG. 3.a

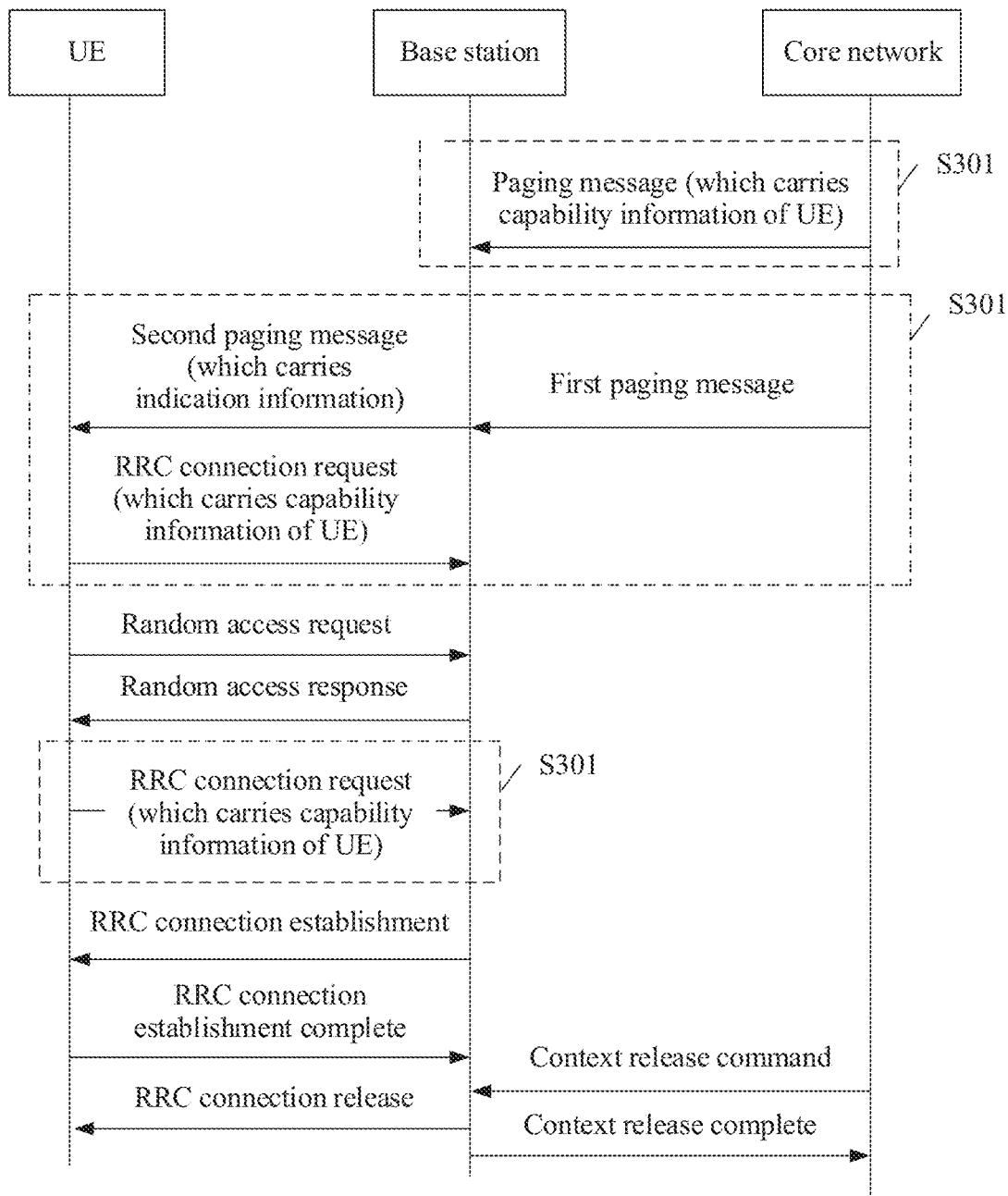
FIG. 3.1

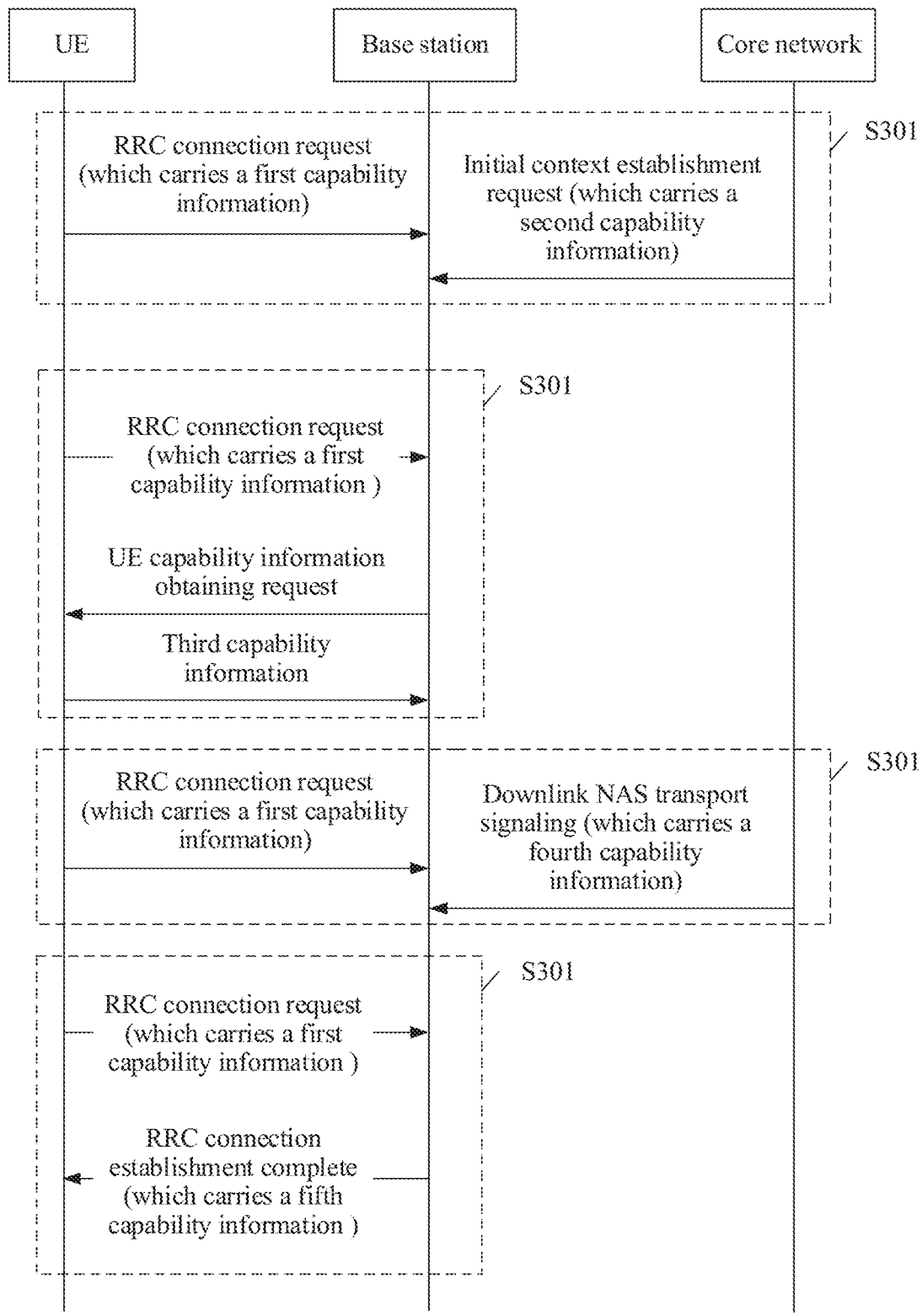
FIG. 3.2

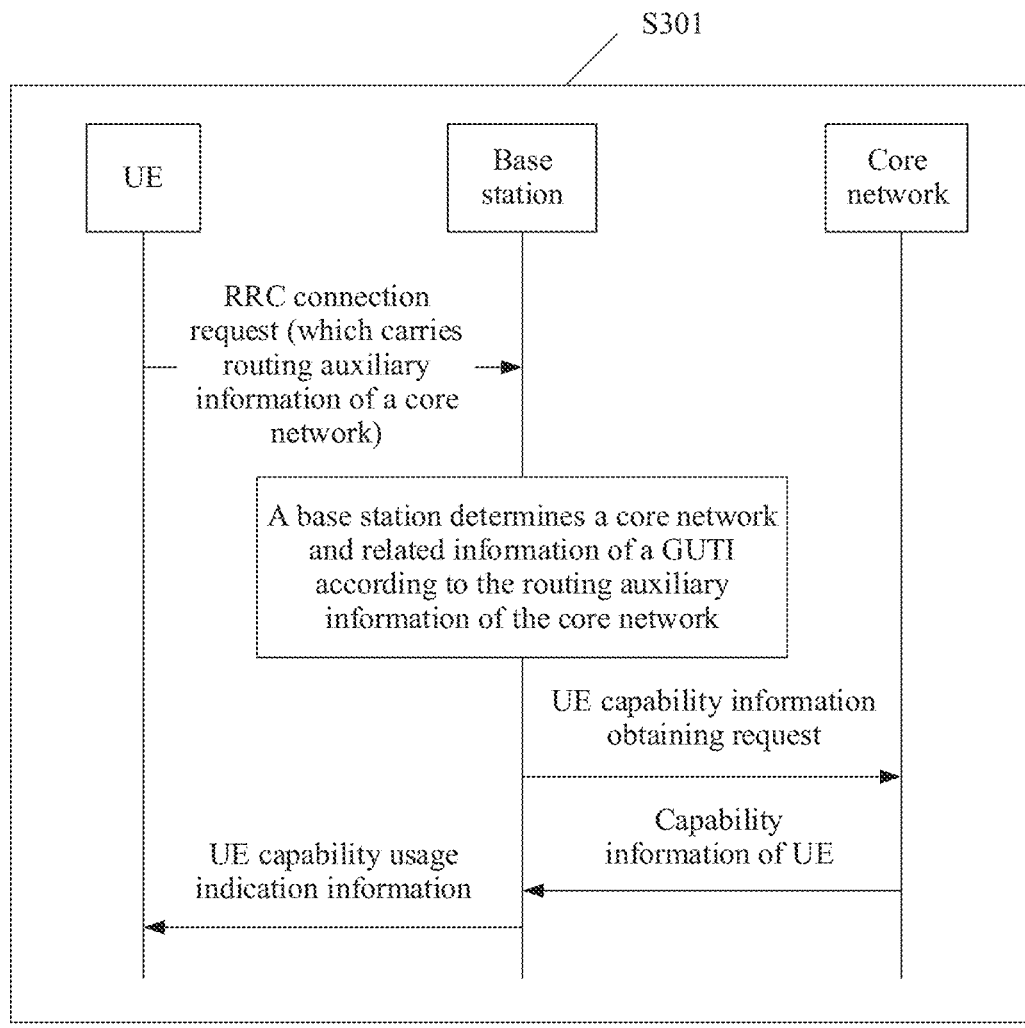
FIG. 3.3
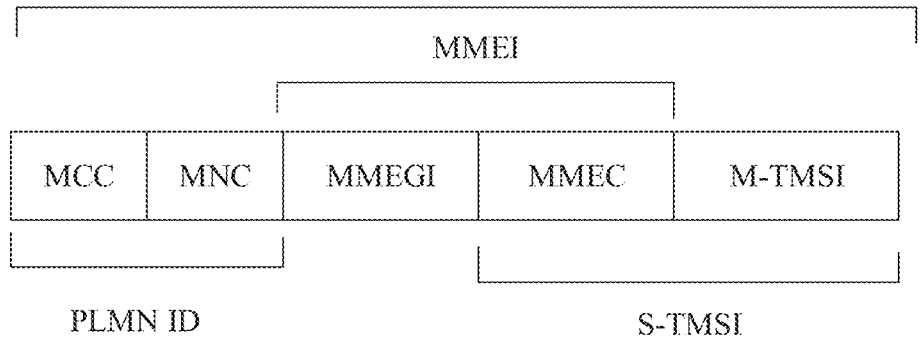
FIG. 3.b

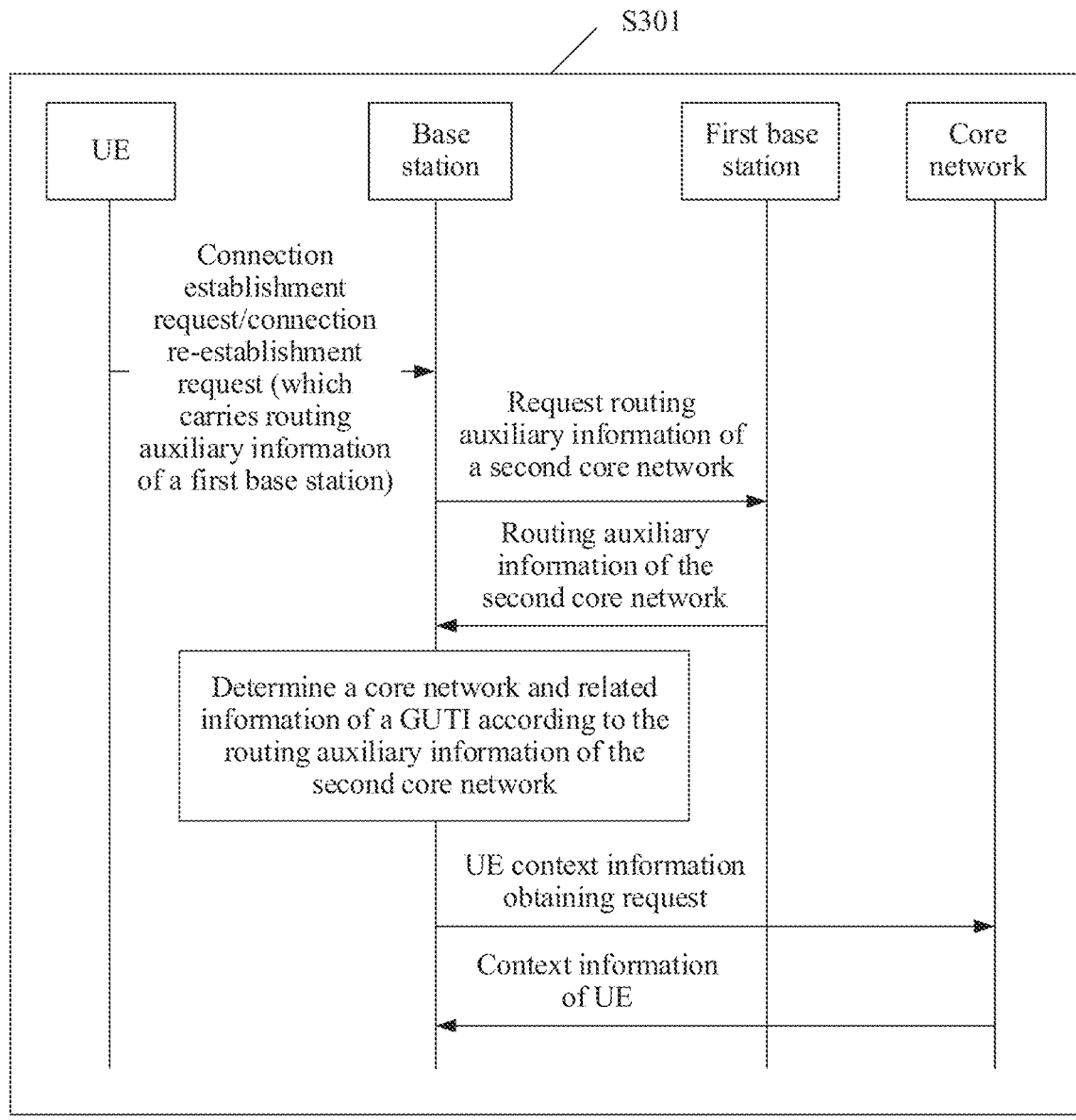
FIG. 3.4

US 12,501,460 B2

DATA SCHEDULING METHOD, BASE STATION, AND SYSTEM

CROSS-REFERENCE TO RELATED APPLICATIONS

This application is a continuation of U.S. patent application Ser. No. 16/028,588, filed on Jul. 6, 2018, which is a continuation of International Application No. PCT/CN2016/104793, filed on Nov. 4, 2016, which claims priority to International Patent Application No. PCT/CN2016/070440, filed on Jan. 7, 2016. All of the afore-mentioned patent applications are hereby incorporated by reference in their entireties.

TECHNICAL FIELD

The present disclosure relates to the field of communications technologies, and in particular, to a data scheduling method, a base station, and a system.

BACKGROUND

With rapid development of wireless communications, people have been no longer fully satisfied with human-to-human communication, and an Internet of Things (Internet Of Things, IOT) technology emerges. Machine-to-machine (Machine to Machine, M2M) communication refers to transferring information and data between machines by using a wireless network, and is an important development direction of the IoT. An M2M device is generally a relatively compact battery-powered system, such as a smart metering system, which needs to periodically monitor and report a use status of water, electricity, gas, or the like.

Generally, a smart metering service is mainly a small data packet reporting service with a small data volume. There are mainly two transmission solutions for this service. One is a control plane (Control Plane, CP)-based transmission solution, and the other is a user plane (User Plane, UP)-based transmission solution. An existing method for obtaining capability information of user equipment (User Equipment, UE) is as follows: After a base station establishes a connection to a mobility management entity (Mobility Management Entity, MME), if the MME stores the capability information of the UE, the MME sends the capability information of the UE to the base station; or if the MME does not store the capability information of the UE, the base station asks the UE for the capability information of the UE and sends the capability information of the UE to the MME. However, in a CP-based data transmission solution, if the existing method for obtaining the capability information of the UE is used, the base station does not have the capability information of the UE when the UE sends data. As such, the base station cannot properly allocate a data scheduling resource to the UE according to the capability information of the UE, and resource utilization is reduced.

SUMMARY

Embodiments of the present disclosure provide a data scheduling method, a base station, and a system, intended to increase resource utilization.

A first aspect of the embodiments of the present disclosure provides a data scheduling method, including:

obtaining, by a base station, capability information of user equipment (UE), where a moment of obtaining the capability information of the UE is prior to that of receiving, by the base station, radio resource control (RRC) connection establishment complete signaling that is sent by the UE to the base station; and allocating, by the base station, a data scheduling resource to the UE according to the capability information of the UE.

With reference to the first aspect of the present disclosure, in a first possible implementation of the first aspect, the obtaining, by a base station, capability information of UE includes:

receiving, by the base station, an RRC connection request that is sent by the UE and that carries the capability information of the UE; or receiving, by the base station, a paging message that is sent by a core network and that carries the capability information of the UE; or receiving, by the base station, a first paging message sent by a core network; if the first paging message does not carry the capability information of the UE, sending, by the base station to the UE, a second paging message that carries indication information, where the indication information is used to instruct the UE to report the capability information of the UE; and receiving, by the base station, an RRC connection request that is sent by the UE and that carries the capability information of the UE.

With reference to the first aspect of the present disclosure, in a second possible implementation of the first aspect, the capability information is first capability information, and after the obtaining, by a base station, capability information of user equipment (UE), the method further includes:

receiving, by the base station, an initial context establishment request that is sent by a core network and that carries the second capability information; or sending, by the base station, a UE capability information obtaining request to the UE, and receiving, by the base station, the third capability information that is sent by the UE in response to the UE capability information obtaining request; or receiving, by the base station, downlink non-access stratum (NAS) transport signaling that is sent by a core network and that carries the fourth capability information; or receiving, by the base station, RRC connection establishment complete signaling that is sent by the UE and that carries the fifth capability information.

With reference to the first aspect of the present disclosure, in a third possible implementation of the first aspect, the obtaining, by a base station, capability information of UE includes:

receiving, by the base station, an RRC connection request sent by the UE, where the RRC connection request carries routing auxiliary information of a first core network, and the first core network is a core network that stores context information of the UE;

determining, by the base station according to the routing auxiliary information of the first core network, a core network and identification information for identifying the UE by the core network;

sending, by the base station, a UE capability information obtaining request to the determined core network, where the UE capability information obtaining request carries the identification information for identifying the UE by the core network, the identification information for identifying the UE by the core network is used by the determined core network to obtain the context information of the UE, and the context information of the UE includes the capability information of the UE; and receiving, by the base station, the capability information that is of the UE and that is sent by the determined core network in response to the UE capability information obtaining request.

With reference to the third possible implementation of the first aspect of the present disclosure, in a fourth possible implementation of the first aspect, after the obtaining, by a base station, capability information of UE, the method further includes:

sending, by the base station, UE capability usage indication information to the UE, where the UE capability usage indication information is used to indicate a UE capability used in data scheduling, and the UE capability usage indication information includes indication information for indicating whether a multi-process HARQ is used in data scheduling, and/or indication information for indicating whether a large transport block size (TBS) is used in data scheduling.

With reference to the third possible implementation of the first aspect of the present disclosure, in a fifth possible implementation of the first aspect, the determining, by the base station according to the routing auxiliary information of the first core network, a core network and identification information for identifying the UE by the core network includes:

determining, by the base station according to the routing auxiliary information of the first core network, a globally unique mobility management entity (MME) identifier (GUMMEI) of the first core network and the identification information for identifying the UE by the core network;

determining, by the base station according to the GUMMEI, whether core networks that can be selected by the base station include the first core network; and selecting, by the base station, the first core network if the core networks that can be selected by the base station include the first core network; or if the core networks that can be selected by the base station do not include the first core network, selecting, by the base station, any one of the core networks that can be selected by the base station.

With reference to the fifth possible implementation of the first aspect of the present disclosure, in a sixth possible implementation of the first aspect, the routing auxiliary information of the first core network includes a System Architecture Evolution (SAE)-temporary mobile subscriber identity (S-TMSI).

With reference to the sixth possible implementation of the first aspect of the present disclosure, in a seventh possible implementation of the first aspect, the routing auxiliary information of the first core network further includes at least one of the following: a selected public land mobile network address index/public land mobile network address (PLMN ID) or a mobility management entity (MME) group identifier (MMEGI).

With reference to the seventh possible implementation of the first aspect of the present disclosure, in an eighth possible implementation of the first aspect, the routing auxiliary information of the first core network includes the S-TMSI and the selected public land mobile network address index/PLMN ID, and the determining, by the base station according to the routing auxiliary information of the first core network, a globally unique mobility management entity (MME) identifier (GUMMEI) of the first core network and the identification information for identifying the UE by the core network includes:

obtaining, by the base station, the MMEGI of the first core network from the base station according to the S-TMSI and the selected public land mobile network address index/PLMN ID; and determining, by the base station according to the S-TMSI, the selected public land mobile network address index/PLMN ID, and the MMEGI, the globally unique mobility management entity (MME) identifier (GUMMEI) of the first core network and the identification information for identifying the UE by the core network.

With reference to the sixth possible implementation of the first aspect of the present disclosure, in a ninth possible implementation of the first aspect, the determining, by the base station according to the routing auxiliary information of the first core network, a globally unique mobility management entity (MME) identifier (GUMMEI) of the first core network and the identification information for identifying the UE by the core network includes:

determining, by the base station, an MMEGI and a PLMN ID of the first core network according to the S-TMSI; and determining, by the base station according to the S-TMSI, the MMEGI, and the PLMN ID, the globally unique mobility management entity (MME) identifier (GUMMEI) of the first core network and the identification information for identifying the UE by the core network.

With reference to the seventh possible implementation of the first aspect of the present disclosure, in a tenth possible implementation of the first aspect, the routing auxiliary information of the first core network includes the S-TMSI and the MMEGI, and the determining, by the base station according to the routing auxiliary information of the first core network, a globally unique mobility management entity (MME) identifier (GUMMEI) of the first core network and the identification information for identifying the UE by the core network includes:

determining, by the base station, the PLMN ID of the first core network according to the S-TMSI; and determining, by the base station according to the S-TMSI, the MMEGI, and the PLMN ID, the globally unique mobility management entity (MME) identifier (GUMMEI) of the first core network and the identification information for identifying the UE by the core network.

With reference to the seventh possible implementation of the first aspect of the present disclosure, in an eleventh possible implementation of the first aspect, the routing auxiliary information of the first core network includes the S-TMSI, the MMEGI, and the selected public land mobile network address index/PLMN ID, and the determining, by the base station according to the routing auxiliary information of the first core network, a globally unique mobility management entity (MME) identifier (GUMMEI) of the first core network and the identification information for identifying the UE by the core network includes:

determining, by the base station according to the S-TMSI, the MMEGI, and the selected public land mobile network address index/PLMN ID, the globally unique mobility management entity (MME) identifier (GUMMEI) of the first core network and the identification information for identifying the UE by the core network.

With reference to any one of the third to the eleventh possible implementations of the first aspect of the present disclosure, in a twelfth possible implementation of the first aspect, after the determining, by the base station according to the routing auxiliary information of the first core network, a core network and identification information for identifying the UE by the core network, the method further includes:

if a core network connected to the base station is changed, sending, by the base station, the identification information for identifying the UE by the core network to a changed core network, where the identification information for identifying the UE by the core network is used by the changed core network to ask the first core network for the context information of the UE.

With reference to the first aspect of the present disclosure, in a thirteenth possible implementation of the first aspect, the obtaining, by a base station, capability information of UE includes:

receiving, by the base station, a connection establishment request or a connection re-establishment request that is sent by the UE and that carries routing auxiliary information of a first base station, where the first base station is a base station that stores routing auxiliary information of a second core network, and the second core network is a core network that stores context information of the UE;

asking, by the base station, the first base station for the routing auxiliary information of the second core network according to the routing auxiliary information of the first base station;

determining, by the base station according to the routing auxiliary information of the second core network, a core network and identification information for identifying the UE by the core network;

sending, by the base station, a UE context information obtaining request to the determined core network, where the UE context information obtaining request carries the identification information for identifying the UE by the core network, the identification information for identifying the UE by the core network is used by the determined core network to obtain the context information of the UE, and the context information of the UE includes the capability information of the UE; and receiving, by the base station, the context information that is of the UE and that is sent by the determined core network in response to the UE context information obtaining request.

With reference to any one of the first aspect, or the first to the thirteenth possible implementations of the first aspect of the present disclosure, in a fourteenth possible implementation of the first aspect, the capability information includes at least one of the following: single-band/multi-band deployment (one band/multi-band deployment), a single-tone/multi-tone indication (single-tone/multi-tone indication), a control plane/user plane indication (CP/UP) indication, a UE category (UE-category), a radio capability (radio capability), a subscriber profile identifier (SPID), access stratum release information (access stratum release), a multi-process HARQ capability, a large TBS capability, a new power type, a mobility enhancement indication, a control plane re-establishment capability, or a re-establishment indication.

With reference to the fourteenth possible implementation of the first aspect of the present disclosure, in a fifteenth possible implementation of the first aspect, the UE category (UE-category) includes UE that supports or needs a multi-process HARQ and/or UE that supports or needs a large TBS.

With reference to the fourteenth or the fifteenth possible implementation of the first aspect of the present disclosure, in a sixteenth possible implementation of the first aspect, the new power type is included in a MAC protocol data unit control element (MAC CE) that carries the RRC connection establishment request.

With reference to any one of the fourteenth to the sixteenth possible implementations of the first aspect of the present disclosure, in a seventeenth possible implementation of the first aspect, the re-establishment includes a user plane (UP) re-establishment indication and/or a control plane (CP) re-establishment indication, the UP re-establishment indication is an indication used to indicate whether mobility enhancement is supported after re-establishment, and the CP re-establishment indication is used to indicate that connection re-establishment is used for CP re-establishment, or is used to distinguish between the CP indication and the UP indication.

With reference to any one of the fourteenth to the seventeenth possible implementations of the first aspect of the present disclosure, in an eighteenth possible implementation of the first aspect, the re-establishment indication is carried in a message sent by the UE to the base station, and the message includes an RRC connection re-establishment request.

With reference to the eighteenth possible implementation of the first aspect of the present disclosure, in a nineteenth possible implementation of the first aspect, the re-establishment indication is further used as an establishment cause value for indication.

With reference to any one of the fourteenth to the nineteenth possible implementations of the first aspect of the present disclosure, in a twentieth possible implementation of the first aspect, before the obtaining, by a base station, capability information of UE, the method further includes:

broadcasting, by the base station, an indication of whether the base station supports mobility enhancement.

A second aspect of the embodiments of the present disclosure provides a data scheduling method, including:

receiving, by a base station, downlink NAS transport signaling that is sent by a core network and that carries capability information of UE; or receiving, by a base station, uplink information transport signaling that is sent by UE and that carries capability information of the UE, and sending, by the base station to a core network, uplink NAS transport signaling that carries the capability information of the UE; and allocating, by the base station, a data scheduling resource to the UE according to the capability information of the UE.

A third aspect of the embodiments of the present disclosure provides a connection release method, including:

receiving, by a base station, downlink NAS transport signaling that is sent by a core network and that carries a connection release indication;

sending, by the base station to UE, downlink information transport signaling that carries the connection release indication; and releasing, by the base station, a connection between the base station and the UE, and sending release signaling to the core network, so that the core network releases an S1 interface after receiving the release signaling.

A fourth aspect of the embodiments of the present disclosure provides a base station, and the base station has a function of implementing base station behavior in the foregoing method design. The function may be implemented by using hardware, or may be implemented by hardware by executing corresponding software. The hardware or software includes one or more modules corresponding to the function. The modules may be software and/or hardware.

The base station includes an obtaining unit and an allocation unit, so as to perform related steps of the data scheduling method provided in the first aspect.

A fifth aspect of the embodiments of the present disclosure provides a base station, the base station includes a transceiver and a processor, and the processor is configured to support the base station in executing a corresponding function in the foregoing method. The transceiver is configured to support communication between the base station and a mobile network server. The base station may further include a memory, and the memory is configured to be coupled to the processor, and stores a necessary program instruction and data of the base station. The base station may further include: a communications interface, used for communication between the base station and another device or communications network.

A sixth aspect of the embodiments of the present disclosure provides a computer storage medium, configured to store a computer software instruction used by the base station, and the computer storage medium includes a program designed to execute the foregoing aspects.

A seventh aspect of the embodiments of the present disclosure provides a communications system, including a base station, user equipment (UE), and a core network, where the base station is configured to: obtain capability information of the UE, where a moment of obtaining the capability information of the UE is prior to that of receiving, by the base station, radio resource control (RRC) connection establishment complete signaling that is sent by the UE to the base station; and allocate a data scheduling resource to the UE according to the capability information of the UE.

With reference to the seventh aspect of the present disclosure, in a first possible implementation of the seventh aspect, the UE is configured to send, to the base station, an RRC connection request that carries the capability information of the UE; and a specific implementation of obtaining the capability information of the user equipment (UE) by the base station is: the base station is configured to receive the RRC connection request that is sent by the UE and that carries the capability information of the UE; or
  the core network is configured to send, to the base station, a paging message that carries the capability information of the UE; and a specific implementation of obtaining the capability information of the user equipment (UE) by the base station is: the base station is configured to receive the paging message that is sent by the core network and that carries the capability information of the UE; or
  the core network is configured to send a first paging message to the base station; the base station is configured to receive the first paging message sent by the core network; the base station is further configured to: if the first paging message does not carry the capability information of the UE, send, to the UE, a second paging message that carries indication information, where the indication information is used to instruct the UE to report the capability information of the UE; the UE is configured to receive the second paging message that is sent by the base station and that carries the indication information; the UE is further configured to send, to the base station, an RRC connection request that carries the capability information of the UE; and a specific implementation of obtaining the capability information of the user equipment (UE) by the base station is: the base station is configured to receive the RRC connection request that is sent by the UE and that carries the capability information of the UE.

With reference to the seventh aspect of the present disclosure, in a second possible implementation of the seventh aspect, the capability information is first capability information, and after the base station obtains the capability information of the user equipment (UE),
  the core network is configured to send, to the base station, an initial context establishment request that carries the second capability information; and the base station is further configured to receive the initial context establishment request that is sent by the core network and that carries the second capability information; or
  the base station is further configured to send a UE capability information obtaining request to the UE; the UE is further configured to receive the UE capability information obtaining request sent by the base station; the UE is further configured to send the third capability information to the base station in response to the UE capability information obtaining request; and the base station is further configured to receive the third capability information that is sent by the UE in response to the UE capability information obtaining request; or
  the core network is configured to send, to the base station, downlink non-access stratum (NAS) transport signaling that carries the fourth capability information; and the base station is further configured to receive the downlink non-access stratum (NAS) transport signaling that is sent by the core network and that carries the fourth capability information; or
  the UE is further configured to send, to the base station, RRC connection establishment complete signaling that carries the fifth capability information; and the base station is further configured to receive the RRC connection establishment complete signaling that is sent by the UE and that carries the fifth capability information.

With reference to the seventh aspect of the present disclosure, in a third possible implementation of the seventh aspect, the UE is configured to send an RRC connection request to the base station, where the RRC connection request carries routing auxiliary information of a first core network, and the first core network is a core network that stores context information of the UE; and a specific implementation of obtaining the capability information of the user equipment (UE) by the base station is:
  the base station is configured to receive the RRC connection request sent by the UE; the base station is further configured to: determine, according to the routing auxiliary information of the first core network, a core network and identification information for identifying the UE by the core network; send a UE capability information obtaining request to the determined core network, where the UE capability information obtaining request carries the identification information for identifying the UE by the core network, the identification information for identifying the UE by the core network is used by the determined core network to obtain the context information of the UE, and the context information of the UE includes the capability information of the UE; and receive the capability information that is of the UE and that is sent by the determined core network in response to the UE capability information obtaining request.

With reference to the third possible implementation of the seventh aspect of the present disclosure, in a fourth possible implementation of the seventh aspect, after the base station receives the capability information that is of the UE and that is sent by the determined core network in response to the UE capability information obtaining request, the base station is further configured to send UE capability usage indication information to the UE, where the UE capability usage indication information is used to indicate a UE capability used in data scheduling, and the UE capability usage indication information includes indication information for indicating whether a multi-process HARQ is used in data scheduling, and/or indication information for indicating whether a large transport block size (TBS) is used in data scheduling.

With reference to the third possible implementation of the seventh aspect of the present disclosure, in a fifth possible implementation of the seventh aspect, a specific implementation of determining, by the base station according to the routing auxiliary information of the first core network, the core network and the identification information for identifying the UE by the core network is:

the base station is configured to: determine, according to the routing auxiliary information of the first core network, a globally unique mobility management entity (MME) identifier (GUMMEI) of the first core network and the identification information for identifying the UE by the core network; determine, according to the GUMMEI, whether core networks that can be selected by the base station include the first core network; and select the first core network if the core networks that can be selected by the base station include the first core network; or if the core networks that can be selected by the base station do not include the first core network, select any one of the core networks that can be selected by the base station.

With reference to the fifth possible implementation of the seventh aspect of the present disclosure, in a sixth possible implementation of the seventh aspect, the routing auxiliary information of the first core network includes a System Architecture Evolution (SAE)-temporary mobile subscriber identity (S-TMSI).

With reference to the sixth possible implementation of the seventh aspect of the present disclosure, in a seventh possible implementation of the seventh aspect, the routing auxiliary information of the first core network further includes at least one of the following: a selected public land mobile network address index/public land mobile network address (PLMN ID) or a mobility management entity (MME) group identifier (MMEGI).

With reference to the seventh possible implementation of the seventh aspect of the present disclosure, in an eighth possible implementation of the seventh aspect, the routing auxiliary information of the first core network includes the S-TMSI and the selected public land mobile network address index/PLMN ID, and a specific implementation of determining, by the base station according to the routing auxiliary information of the first core network, the globally unique mobility management entity (MME) identifier (GUMMEI) of the first core network and the identification information for identifying the UE by the core network is:

the base station is configured to obtain the MMEGI of the first core network from the base station according to the S-TMSI and the selected public land mobile network address index/PLMN ID; and determine, according to the S-TMSI, the selected public land mobile network address index/PLMN ID, and the MMEGI, the globally unique mobility management entity (MME) identifier (GUMMEI) of the first core network and the identification information for identifying the UE by the core network.

With reference to the sixth possible implementation of the seventh aspect of the present disclosure, in a ninth possible implementation of the seventh aspect, a specific implementation of determining, by the base station according to the routing auxiliary information of the first core network, the globally unique mobility management entity (MME) identifier (GUMMEI) of the first core network and the identification information for identifying the UE by the core network is:

the base station is configured to determine an MMEGI and a PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

With reference to the seventh possible implementation of the seventh aspect of the present disclosure, in a tenth possible implementation of the seventh aspect, the routing auxiliary information of the first core network includes the S-TMSI and the MMEGI, and a specific implementation of determining, by the base station according to the routing auxiliary information of the first core network, the globally unique mobility management entity (MME) identifier (GUMMEI) of the first core network and the identification information for identifying the UE by the core network is:

the base station is configured to determine the PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

With reference to the seventh possible implementation of the seventh aspect of the present disclosure, in an eleventh possible implementation of the seventh aspect, the routing auxiliary information of the first core network includes the S-TMSI, the MMEGI, and the selected public land mobile network address index/PLMN ID, and a specific implementation of determining, by the base station according to the routing auxiliary information of the first core network, the globally unique mobility management entity (MME) identifier (GUMMEI) of the first core network and the identification information for identifying the UE by the core network is:

the base station is configured to determine, according to the S-TMSI, the MMEGI, and the selected public land mobile network address index/PLMN ID, the globally unique mobility management entity (MME) identifier (GUMMEI) of the first core network and the identification information for identifying the UE by the core network.

With reference to any one of the third to the eleventh possible implementations of the seventh aspect of the present disclosure, in a twelfth possible implementation of the seventh aspect, after the base station determines, according to the routing auxiliary information of the first core network, the core network and the identification information for identifying the UE by the core network, the base station is further configured to: if a core network connected to the base station is changed, send the identification information for identifying the UE by the core network to a changed core network, where the identification information for identifying the UE by the core network is used by the changed core network to ask the first core network for the context information of the UE.

With reference to the seventh aspect of the present disclosure, in a thirteenth possible implementation of the seventh aspect, the UE is configured to send, to the base station, a connection establishment request or a connection re-establishment request that carries routing auxiliary information of a first base station, where the first base station is a base station that stores routing auxiliary information of a second core network, and the second core network is a core network that stores context information of the UE; and a specific implementation of obtaining the capability information of the user equipment (UE) by the base station is:

the base station is configured to receive the connection establishment request or the connection re-establishment request that is sent by the UE and that carries the routing auxiliary information of the first base station; and the base station is further configured to: ask the first base station for the routing auxiliary information of the second core network according to the routing auxiliary information of the first base station; determine, according to the routing auxiliary information of the second core network, a core network and identification information for identifying the UE by the core network; send a UE context information obtaining request to the determined core network, where the UE context information obtaining request carries the identification information for identifying the UE by the core network, the identification information for identifying the UE by the core network is used by the determined core network to obtain the context information of the UE, and the context information of the UE includes the capability information of the UE; and receive the context information that is of the UE and that is sent by the determined core network in response to the UE context information obtaining request.

With reference to any one of the seventh aspect, or the first to the thirteenth possible implementations of the seventh aspect of the present disclosure, in a fourteenth possible implementation of the seventh aspect, the capability information includes at least one of the following: single-band/multi-band deployment (one band/multi-band deployment), a single-tone/multi-tone indication (single-tone/multi-tone indication), a control plane/user plane indication (CP/UP) indication, a UE category (UE-category), a radio capability (radio capability), a subscriber profile identifier (SPID), access stratum release information (access stratum release), a multi-process HARQ capability, a large TBS capability, a new power type, a mobility enhancement indication, a control plane re-establishment capability, or a re-establishment indication.

With reference to the fourteenth possible implementation of the seventh aspect of the present disclosure, in a fifteenth possible implementation of the seventh aspect, the UE category (UE-category) includes UE that supports or needs a multi-process HARQ and/or UE that supports or needs a large TBS.

With reference to the fourteenth or the fifteenth possible implementation of the seventh aspect of the present disclosure, in a sixteenth possible implementation of the seventh aspect, the new power type is included in a MAC protocol data unit control element (MAC CE) that carries the RRC connection establishment request.

With reference to the fourteenth to the sixteenth possible implementations of the seventh aspect of the present disclosure, in a seventeenth possible implementation of the seventh aspect, the re-establishment includes a user plane (UP) re-establishment indication and/or a control plane (CP) re-establishment indication, the UP re-establishment indication is an indication used to indicate whether mobility enhancement is supported after re-establishment, and the CP re-establishment indication is used to indicate that connection re-establishment is used for CP re-establishment, or is used to distinguish between the CP indication and the UP indication.

With reference to the fourteenth to the seventeenth possible implementations of the seventh aspect of the present disclosure, in an eighteenth possible implementation of the seventh aspect, the re-establishment indication is carried in a message sent by the UE to the base station, and the message includes an RRC connection re-establishment request.

With reference to the eighteenth possible implementation of the seventh aspect of the present disclosure, in a nineteenth possible implementation of the seventh aspect, the re-establishment indication is further used as an establishment cause value for indication.

With reference to the thirteenth to the nineteenth possible implementations of the seventh aspect of the present disclosure, in a twentieth possible implementation of the seventh aspect, before the base station obtains the capability information of the user equipment (UE), the base station is further configured to broadcast an indication of whether the base station supports mobility enhancement.

It may be learned that in the embodiments of the present disclosure, a base station obtains capability information of UE, where a moment of obtaining the capability information of the UE by the base station is prior to that of receiving, by the base station, radio resource control (RRC) connection establishment complete signaling that is sent by the UE to the base station. When data transmission is performed based on a CP transmission solution, data is carried in a NAS message that is carried in the RRC connection establishment complete signaling sent by the UE to the base station. Therefore, the base station obtains the capability information of the UE before the UE sends the data, so that the base station can properly allocate a data scheduling resource to the UE according to the capability information of the UE, and resource utilization is increased.

The aspects or other aspects of the present disclosure are clearer and more comprehensible in the descriptions of the following embodiments.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 3 shows a schematic flowchart of a data scheduling method according to an embodiment of the present disclosure;

FIG. 3.*a* shows a schematic diagram of a Data Volume And Power Headroom Report MAC CE according to an embodiment of the present disclosure;

FIG. 3.1 shows a schematic flowchart of another data scheduling method according to an embodiment of the present disclosure;

FIG. 3.2 shows a schematic flowchart of another data scheduling method according to an embodiment of the present disclosure;

FIG. 3.3 shows a schematic flowchart of another data scheduling method according to an embodiment of the present disclosure;

FIG. 3.b shows a schematic compositional diagram of a GUTI in the data scheduling method in FIG. 3.3;

FIG. 3.4 shows a schematic flowchart of another data scheduling method according to an embodiment of the present disclosure;

DESCRIPTION OF EMBODIMENTS

To make persons skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

Detailed descriptions are separately provided in the following.

In the specification, claims, and accompanying drawings of the present disclosure, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The "embodiment" mentioned in this specification means that a particular feature, a structure, or a characteristic described with reference to the embodiments may be included in at least one embodiment of the present disclosure. Such phrases appearing in all locations of the specification are neither necessarily a same embodiment nor an independent or alternative embodiment that is mutually exclusive from another embodiment. Persons skilled in the art should explicitly and implicitly understand that the embodiments described in the specification may be in combination with another embodiment.

Figure 1:
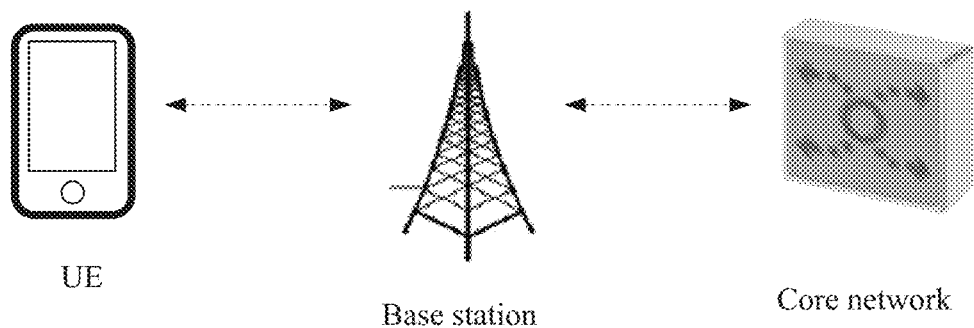
FIG. 1 shows a network architecture according to an embodiment of the present disclosure.

To better understand a data scheduling method, a base station, and a system disclosed in the embodiments of the present disclosure, the following first describes a network architecture that is applicable to the embodiments of the present disclosure. Referring to FIG. 1, FIG. 1 is a schematic diagram of a network architecture according to an embodiment of the present disclosure. The network architecture shown in FIG. 1 may include a base station, UE, and a core network. In the network architecture shown in FIG. 1, the UE may include various terminal devices, such as a mobile phone, a tablet computer, a personal digital assistant (Personal Digital Assistant, PDA), a mobile Internet device (Mobile Internet Device, MID), and an intelligent wearable device (such as a smartwatch and a smart band). This is not limited in this embodiment of the present disclosure. The base station may be an evolved NodeB in an LTE system or an LTE-Advanced system, or may be a NodeB in a Universal Mobile Telecommunication System (Universal Mobile Telecommunication System, UMTS). This is not limited in this embodiment of the present disclosure. The core network may be an MME. The data scheduling method provided in the present disclosure is applied to communication in various systems, such as M2M and an IoT.

Figure 2:
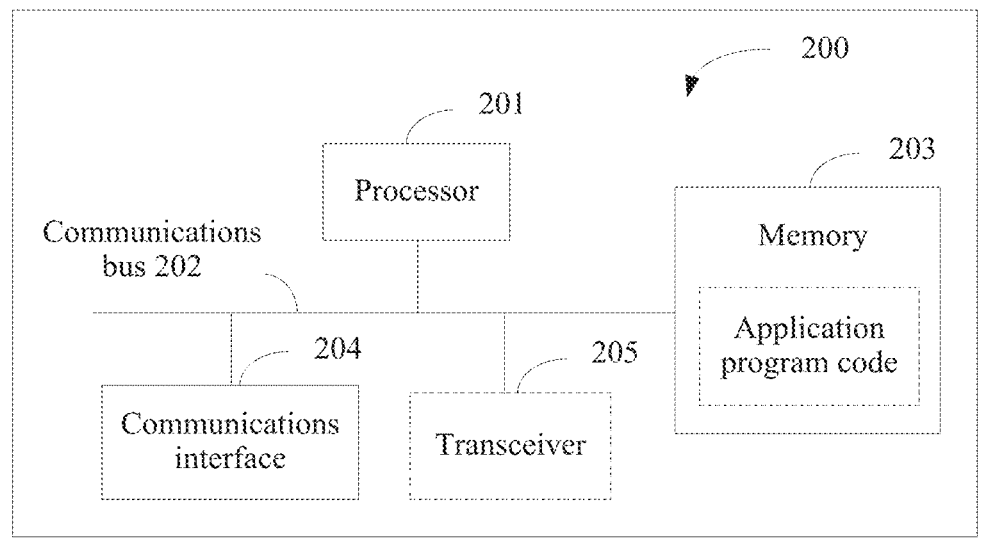
FIG. 2 shows a schematic structural diagram of a base station according to an embodiment of the present disclosure.

FIG. 2 is a schematic diagram of a base station according to an embodiment of the present disclosure. The base station 200 includes at least one processor 201, a communications bus 202, a memory 203, at least one communications interface 204, and a transceiver 205.

The processor 201 may be a general-purpose central processing unit (CPU), a microprocessor, an disclosure-specific integrated circuit (disclosure-specific integrated circuit, ASIC), or one or more integrated circuits that are configured to control program execution of the solutions in the present disclosure.

The communications bus 202 may include a channel through which information is transmitted between the foregoing components. The communications interface 204 uses any apparatus of a transceiver type to communicate with another device or communications network, such as an Ethernet, a radio access network (RAN), or a wireless local area network (Wireless Local Area Networks, WLAN).

The memory 203 may be a read-only memory (read-only memory, ROM), or another type of static storage device that can store static information and a static instruction, or a random access memory (random access memory, RAM), or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or other optical disk storage or optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by a computer. However, this is not limited herein. The memory may exist independently and be connected to the processor by using a bus. Alternatively, the memory may be integrated with the processor.

The memory 203 is configured to store disclosure program code that executes the solutions of the present disclosure, and the processor 201 controls the execution. The processor 201 is configured to execute the disclosure program code stored in the memory 203.

The code stored in the memory 203 of the base station shown in FIG. 2 may be executed to execute the data scheduling method provided in the present disclosure, for example, obtaining capability information of UE, and then allocating a data scheduling resource to the UE according to the capability information of the UE.

In specific implementation, in an embodiment, the base station 200 may further include the transceiver 205. The transceiver 205 communicates with the processor 201, and may display information in multiple manners. The transceiver 205 communicates with the processor 201, and may receive, in multiple manners, signaling sent by an disclosure server or a service layer apparatus.

Consistent with the technical solution described above, in a specific embodiment, FIG. 3 is a schematic flowchart of a data scheduling method including a specific execution process of a base station. Although the data scheduling method described herein is executed by the base station shown in FIG. 2, it should be noted that a specific execution environment of the data scheduling method disclosed in this embodiment of the present disclosure is not limited to the base station.

As shown in FIG. 3, the data scheduling method disclosed in this method embodiment of the present disclosure specifically includes the following steps.

S301. A base station obtains capability information of user equipment (UE), where a moment of obtaining the capability information of the UE is prior to that of receiving, by the base station, radio resource control (RRC) connection establishment complete signaling that is sent by the UE to the base station.

Optionally, the capability information of the UE may include at least one of the following: a UE priority, (single-band/multi-band deployment) one band/multi-band deployment, a single-tone/multi-tone indication (single-tone/multi-tone indication) (an indication of a scheduling unit, which may be specifically a single subcarrier, a carrier, or the like), a (control plane/user plane indication) CP/UP indication, a (UE category) UE-category, a subscriber profile identifier (Subscribe Profile Identifier, SPID), a (radio capability) radio capability, (access stratum release information) access stratum release, a multi-process hybrid automatic repeat request (Hybrid-ARQ, HARQ) capability, a large transport block size (Transport Block Size, TBS) capability, a new power type (New Power Class), a mobility enhancement indication, or a re-establishment indication.

For example, the UE category (UE-category) includes UE that supports or needs a multi-process HARQ and/or UE that supports or needs a large TBS.

For example, the re-establishment indication includes a UP (user plane) re-establishment indication and/or a CP (control plane) re-establishment indication.

For example, the UP re-establishment indication is an indication used to indicate whether mobility enhancement is supported after re-establishment.

For example, the CP re-establishment indication is used to indicate that connection re-establishment is used for CP re-establishment solution, or is used to distinguish between the CP indication and the UP indication.

For example, the re-establishment indication is carried in a message sent by the UE to the base station, and the re-establishment indication is used as an establishment cause value for indication.

For example, the re-establishment indication is carried in a message sent by the UE to the base station, and the message may be an RRC connection re-establishment request, an RRC connection establishment request, an RRC connection resume request, or the like.

For example, the re-establishment indication may be used as an establishment cause value in the message for indication, or the re-establishment indication may be used as an indication information element in the message.

For a CP solution, a re-establishment procedure is not supported in R13. However, after R14 is introduced, a distinguishing indication needs to be given for a CP solution and a UP solution. The re-establishment indication may be a re-establishment indication used only for a CP solution, or an indication message used to distinguish between CP re-establishment and UP solution re-establishment. Alternatively, the re-establishment indication may be an indication for distinguishing between UP re-establishment in different releases. The CP solution refers to optimization in a control plane, and the UP solution is an optimization solution in a user plane.

In R13, NB-IoT UP UE does not support mobility enhancement, that is, does not support a PDCP STATUS REPORT procedure, or transfer of X2 interface data and a UE context in the re-establishment procedure. In R14, UE supports mobility enhancement. Therefore, mobility enhancement is used as a capability, and the UE may consider supporting a PDCP STATUS REPORT procedure or uplink data retransmission, and transfer of X2 interface data and a UE context. The uplink data retransmission means that when the UE sends uplink data during a previous connection, but before a cell handover, does not receive an acknowledgement that a receiver has received the data, the UE needs to support a capability of receiving a PDCP status report (PDCP STATUS REPORT) in a re-establishment procedure, so as to learn an uplink PDCP SN corresponding to data that is not sent to a base station, and perform retransmission. Because the PDCP STATUS REPORT is not supported in R13, the UE cannot perform uplink data retransmission.

As a capability of UE, the mobility enhancement is mainly used when the UE moves, for example, during an RRC connection re-establishment procedure (such as a cell change, a cell handover, or cell reselection) triggered by an RLF. When UE using a UP solution sends an RRC connection re-establishment request to a target base station, after receiving the indication information, the base station may learn that the UE can support at least one of a PDCP STATUS REPORT procedure or transfer of a context and data between base stations. The UE herein may be UE using a UP solution in an NB-IoT.

The indication information may represent a mobility enhancement capability indication, or other information such as a release information indication.

After receiving related indication information, a target base station may transfer the indication information on an X2 interface, so that a source base station performs corresponding processing, and forwards a UE context and data to the target base station. The indication information includes at least one of a mobility enhancement indication, a UP re-establishment indication, a re-establishment indication, or a CP re-establishment indication.

Optionally, the base station broadcasts an indication of whether the base station supports mobility enhancement.

From a perspective of the base station, mobility enhancement may be considered as a capability of the base station. Different base stations may have different capabilities of supporting UE mobility. For example, a base station in R13 may not support a re-establishment procedure used for a CP, or may not support X2 interface data forwarding in a UP solution. However, a base station in R14 may support both or either of a re-establishment procedure used for a CP or X2 interface data forwarding in a UP solution. The base station may indicate whether the base station supports mobility enhancement, and may separately indicate different capabilities, for example, whether CP re-establishment or UP mobility enhancement is supported, or may uniformly indicate capabilities related to mobility enhancement, for example, may broadcast an indication by using a system message. Specifically, when the base station supports a mobility enhancement capability, the base station gives an indication by means of a system broadcast. The base station may use 1 bit to uniformly indicate or use multiple bits to separately indicate multiple specific capabilities included in mobility enhancement. When performing RRC connection establishment or RRC connection re-establishment, the UE may choose, according to an indication message, whether to access a cell or a base station. For example, when the base station broadcasts an indication of supporting a mobility enhancement capability, UE that supports mobility enhancement may choose to access a cell; or if the base station does not support a mobility enhancement capability, that is, the base station does not broadcast an indication of supporting a mobility enhancement capability, or an indication of not supporting a mobility enhancement capability, the UE may choose not to access the cell. After the UE accesses the cell, the base station may perform different operations according to UE capabilities, for example, low priority handling, rejecting or releasing a connection, and transferring capability information to another node.

Optionally, the base station may notify, by using dedicated signaling, the UE of whether the base station supports a mobility enhancement capability. After the UE accesses the cell, the base station may notify the UE by using the dedicated signaling, such as an RRC connection establishment, RRC connection re-establishment, RRC connection reject or release message, or another message.

Specifically, for example, after the UE sends an RRC connection re-establishment request when the UE accesses a target cell, if the target base station does not have an available UE context, and does not support a mobility enhancement capability, the target base station notifies the UE by using dedicated signaling.

Optionally, when selecting or reselecting a cell, the UE may consider this factor for cell selection. In an optional manner, the base station broadcasts some cells that support mobility enhancement, and the base station may broadcast, in a system broadcast, an offset (offset) of a cell that supports a mobility enhancement capability. The UE that supports a mobility enhancement capability may use the offset for cell selection or reselection. In another optional manner, reselection or selection is performed only on cells that support a mobility enhancement capability, and a ranking mechanism or a priority mechanism may be used. Alternatively, UE that supports mobility enhancement may consider that a cell that supports mobility enhancement has a high priority, and may preferentially select the cell during selection. Optionally, when the base station learns whether another cell supports a mobility enhancement capability, the base station may set a cell specific offset for a cell that supports a mobility enhancement capability.

For UE that has accessed a cell that supports mobility enhancement, when the UE moves, for example, when the UE is handed over, when an RLF triggers a re-establishment procedure, or when the connected-mode UE performs cell reselection, if a target base station accessed by the UE does not support mobility enhancement, that is, the target base station does not support an operation such as forwarding a UE context and data between base stations, the target base station may reject or release a connection of the UE, or redirect the UE to another cell that supports this feature, or re-establish a connection. Alternatively, the target base station may give an indication to a source base station, and the source base station may transfer only a UE context according to the indication information; or the target base station may instruct the source base station to delete a stored UE context and stored data.

If a base station initially accessed by the UE does not support mobility enhancement, but a target base station of a cell accessed by the UE supports forwarding data and a UE context after the UE moves, optionally, the UE may give an indication to the target base station, to indicate that the base station that previously establishes a connection to the UE does not support mobility enhancement. If the target base station does not have a UE context, the target base station may reject or release a connection, or re-establish a connection. Alternatively, when the target base station receives a re-establishment request from the UE, the target base station sends an RLF indication, a context re-obtaining request, or another indication message to a source base station, and the source base station may return indication information for rejecting or not supporting this operation, or may transfer only a UE context without transferring data, and give an indication. A specific bearer message is not limited, and may be an existing X2 interface message, or may be a new message.

The base station broadcasts an indication of a UE category or a used UE capability specific to a multicast service of the base station. For a multicast service, such as a Single Cell Point To Multipoint (Single Cell Point To Multipoint, SC-PTM) service in the NB-IoT, because different UEs have different categories and capabilities, the base station needs to broadcast an indication of a UE category or a UE capability specific to such type of multicast service transmission, so that the UE determines, according to the UE category or the UE capability, whether to accept the multicast service. For example, the indication may include an indication of whether a common TBS or a large TBS is used in multicast service transmission, an indication of whether a single-process HARQ or a multi-process HARQ is used in multicast service transmission, an indication of the UE category, and the like. In addition, because multiple SC-PTM services are performed in a network at the same time, the foregoing indication may be for all SC-PTM services in a current cell. To implement flexible control, the base station may also separately give the foregoing indication for each SC-PTM service.

It should be noted that a time at which the base station broadcasts the indication of the UE category or the used UE capability specific to the multicast service of the base station may or may not be prior to step S301. In addition, idle-mode UE may also receive the indication. This is not limited in the present disclosure.

Optionally, the new power type is included in a MAC protocol data unit (MAC PDU) control element (MAC CE) that carries the RRC connection establishment request. For example, a new power type of the UE is indicated in a Data Volume And Power Headroom Report (Data Volume and Power Headroom Report) MAC CE shown in FIG. 3.*a*. A specific manner may be as follows: An existing reserved bit R is used to give an indication of a new power type. A quantity of used reserved bits depends on a quantity of new power types that need to be indicated. If only one new power type is supported in a network, only one reserved bit needs to be used to indicate the new power type; or if two or three new power types are supported in a network, two reserved bits need to be used to indicate the new power types. Designing a new MAC CE may be avoided by using a reserved bit in an existing MAC CE to give an indication of a new power type. In addition, signaling overheads may be reduced by reporting the new power type and other information together to the base station.

For example, referring to FIG. 3.1, FIG. 3.1 is a schematic flowchart of another data scheduling method according to an embodiment of the present disclosure.

Optionally, a specific implementation of obtaining the capability information of the user equipment (UE) by the base station is: the base station receives an RRC connection request that is sent by the UE and that carries the capability information of the UE. Specifically, the RRC connection request sent by the UE to the base station carries the capability information of the UE. The capability information may be all capability information of the UE, or may be some capability information of the UE. This specifically depends on a capacity of the RRC connection request signaling. If the capacity of the RRC connection request signaling is sufficient, the RRC connection request signaling carries all the capability information of the UE; or if the capacity of the RRC connection request signaling is limited, the RRC connection request signaling carries some necessary capability information of the UE, for example, a UE priority, a single-tone/multi-tone indication, or a CP/UP indication. Optionally, some capability information of the UE may be grouped and written into a protocol. The RRC connection request signaling needs to carry only an index number of a capability information group of the UE without carrying the capability information of the UE.

Optionally, a specific implementation of obtaining the capability information of the user equipment (UE) by the base station is: the base station receives a paging message that is sent by a core network and that carries the capability information of the UE. Specifically, when the core network delivers the paging message to the base station, if the core network stores context information of the UE, the core network adds the capability information of the UE to the paging message sent to the base station, and the context information of the UE includes the capability information of the UE. After receiving the capability information of the UE, the base station stores the capability information of the UE for subsequent use after a connection to the UE.

Optionally, a specific implementation of obtaining the capability information of the user equipment (UE) by the base station is: the base station receives a first paging message sent by a core network; if the first paging message does not carry the capability information of the UE, the base station sends, to the UE, a second paging message that carries indication information, where the indication information is used to instruct the UE to report the capability information of the UE; and the base station receives an RRC connection request that is sent by the UE and that carries the capability information of the UE. Specifically, if the core network does not store context information of the UE, the first paging message sent by the core network to the base station does not carry the capability information of the UE, and the base station adds the indication information to the second paging message sent to the UE. The indication information is used to indicate that the UE needs to subsequently report the capability information of the UE to the base station, and the UE may add the capability information of the UE to RRC connection request signaling subsequently sent to the base station. In another embodiment, the UE may also add the capability information of the UE to other signaling subsequently sent to the base station, for example, RRC connection establishment complete signaling.

For example, referring to FIG. 3.2, FIG. 3.2 is a schematic flowchart of another data scheduling method according to an embodiment of the present disclosure.

Optionally, the capability information includes first capability information, and the capability information further includes second capability information, third capability information, a fourth capability information, or fifth capability information. That a base station obtains capability information of user equipment (UE) includes: the base station receives an RRC connection request that is sent by the UE and that carries the first capability information; and the base station receives an initial context establishment request that is sent by a core network and that carries the second capability information. Alternatively, that a base station obtains capability information of user equipment (UE) includes: the base station receives an RRC connection request that is sent by the UE and that carries the first capability information; the base station sends a UE capability information obtaining request to the UE; and the base station receives the third capability information that is sent by the UE in response to the UE capability information obtaining request. Alternatively, that a base station obtains capability information of user equipment (UE) includes: the base station receives an RRC connection request that is sent by the UE and that carries the first capability information; and the base station receives downlink non-access stratum (Non Access Stratum, NAS) transport signaling that is sent by a core network and that carries the fourth capability information. Alternatively, that a base station obtains capability information of user equipment (UE) includes: the base station receives an RRC connection request that is sent by the UE and that carries the first capability information; and the base station receives RRC connection establishment complete signaling that is sent by the UE and that carries the fifth capability information.

Specifically, because the capacity of the RRC connection request signaling delivered by the UE to the base station is limited, the RRC connection request signaling may carry only some necessary capability information (the first capability information) of the UE, for example, a UE priority, a single-tone/multi-tone indication, and a CP/UP indication. If the UE still needs to transmit uplink data subsequently, in order that the base station can more properly allocate a data scheduling resource to the UE, after the UE sends the first capability information to the base station, the base station needs to obtain remaining capability information of the UE. Specific methods of obtaining the remaining capability information may include the following: 1. The core network may add the second capability information to initial context establishment request signaling delivered to the base station (or other signaling delivered by the core network to the base station). Optionally, before the core network sends the initial context establishment request signaling to the base station (or the core network sends other signaling to the base station), the base station may add indication information to initial UE information signaling sent to the core network, to indicate capability information that is of the UE and that is to be sent by the core network to the base station. 2. The base station sends the UE capability information obtaining request (specifically, the base station may send UE capability information obtaining signaling to the UE, or the base station may deliver other signaling to the UE) to the UE. The UE capability information obtaining request may carry indication information, to indicate capability information that is of the UE and that is sent by the UE to the base station, and the UE sends the third capability information to the base station in response to the UE capability information obtaining request. 3. When the core network needs to deliver downlink data, the core network may add the fourth capability information to the downlink NAS transport signaling sent to the base station. 4. The UE sends the RRC connection establishment complete signaling to the base station, and the signaling carries the fifth capability information of the UE. Optionally, before the UE sends the RRC connection establishment complete signaling to the base station, the base station may add indication information to RRC connection establishment request signaling sent to the UE, to indicate capability information that is of the UE and that is sent by the core network to the base station. Optionally, because a capacity of the RRC connection establishment complete signaling is relatively large, the signaling may carry all the capability information of the UE. In this case, the fifth capability information may include the first capability information.

Optionally, the second capability information, the third capability information, the fourth capability information, and the fifth capability information may be same capability information, or may be different capability information. This is not limited in the present disclosure.

Optionally, a relationship between the first capability information and each of the second capability information, the third capability information, the fourth capability information, or the fifth capability information may be an inclusion relationship, or may be an intersection relationship, or may be an incompatibility relationship, or the like. This is not limited in the present disclosure.

For example, referring to FIG. 3.3, FIG. 3.3 is a schematic flowchart of another data scheduling method according to an embodiment of the present disclosure.

Optionally, a specific implementation of obtaining the capability information of the user equipment (UE) by the base station is: the base station receives an RRC connection request sent by the UE, where the RRC connection request carries routing auxiliary information of a first core network, and the first core network is a core network that stores context information of the UE; the base station determines, according to the routing auxiliary information of the first core network, a core network and identification information for identifying the UE by the core network; the base station sends a UE capability information obtaining request to the determined core network, where the UE capability information obtaining request carries the identification information for identifying the UE by the core network, the identification information for identifying the UE by the core network is used by the determined core network to obtain the context information of the UE, and the context information of the UE includes the capability information of the UE; and the base station receives the capability information that is of the UE and that is sent by the determined core network in response to the UE capability information obtaining request.

For example, when sending the UE capability information obtaining request to the core network, the base station adds the identification information for identifying the UE by the core network (the identification information for identifying the UE by the core network is used by the core network to find, according to the identification information, the context information that is of the UE and that is stored in the core network, and the identification information for identifying the UE by the core network may be a globally unique temporary UE identity (Globally Unique Temporary UE Identity, GUTI), or a combination of a globally unique mobility management entity (MME) identifier (Globally Unique MME Identity, GUMMEI) and a System Architecture Evolution (system architecture evolution, SAE)-temporary mobile subscriber identity (S-TMSI), or an S-TMSI, or an eNB MME UE S1AP ID, or an S1AP UE ID pair (S1-AP UE ID pair), or the like) to the UE capability information obtaining request, so as to verify whether the determined core network is a core network that stores the context information of the UE (or a core network with which the UE is previously registered). If the determined core network is the core network that stores the context information of the UE (or the core network with which the UE is previously registered), the determined core network may directly obtain the prestored context information of the UE according to the identification information for identifying the UE by the core network; or if the determined core network is not the core network that stores the context information of the UE (or the core network with which the UE is previously registered), the determined core network obtains, according to the identification information for identifying the UE by the core network, the context information of the UE from a core network (the first core network) that is previously connected to the UE, and then the determined core network adds the capability information of the UE to signaling sent to the base station, so as to send the capability information of the UE to the base station.

Optionally, the GUTI includes a PLMN ID, an MMEI, and an M-TMSI. A specific composition of the GUTI is shown in FIG. 3.b.

Optionally, that the base station sends the UE capability information obtaining request to the determined core network may be implemented by using UE capability information request signaling sent by the base station to the core network, or may be implemented by using other signaling sent by the base station to the core network. This is not limited in the present disclosure.

Optionally, as shown in FIG. 3.4, after step S301 in which the base station obtains the capability information of the user equipment (UE), the method further includes: the base station sends UE capability usage indication information to the UE, where the UE capability usage indication information is used to indicate a UE capability used in data scheduling, and the UE capability usage indication information includes indication information for indicating whether a multi-process HARQ is used in data scheduling, and/or indication information for indicating whether a TBS is used in data scheduling.

For example, currently, the 3GPP organization has completed standardization of the NB-IoT of Rel-13, and is enhancing the NB-IoT of Rel-14. In Rel-13, a rate supported by an NB-IoT terminal is low, and an disclosure scenario is limited. Two new features: a double-process HARQ (there is only a single-process HARQ in Rel-13) and a larger TBS are introduced into the NB-IoT of Rel-14, to increase a transmission rate of the NB-IoT terminal. Currently, a UE capability obtained by the base station does not include a newly-introduced double-process HARQ capability or a large TBS capability, and the base station cannot use the two features in an RRC connection establishment message or in subsequent data scheduling, to perform scheduling for the UE. As a result, scheduling performance is affected.

In this embodiment of the present disclosure, the base station first obtains a UE capability, and then indicates whether the UE supports new features that include a multi-process HARQ capability and a large TBS capability. If the obtained UE capability supports the two new features, the base station may indicate, in the RRC connection establishment message, whether the two new features are used in subsequent data scheduling for the UE. The UE separately indicates support for the two features. For example, a separate indication (for example, 1 bit) is used to indicate whether the multi-process HARQ is supported, and another separate indication is used to indicate whether the large TBS is supported. Certainly, a uniform indication may also be used to indicate whether the UE supports both of the two features (because the two features are for implementing a high data rate, the uniform indication results in fewer overheads). In addition, a name of an indication may be a UE capability, or may be a UE type. In addition, likewise, for an indication to the UE, the base station may use two separate indications, or may use a uniform indication.

In addition, the base station needs to give an indication to the UE because both of the two new features are for providing a higher transmission rate, and the NB-IoT needs to first ensure coverage of the network. When the UE is in relatively poor coverage, a large quantity of repeated transmissions need to be performed to enhance the coverage, and therefore the high transmission rate cannot be implemented. That is, although some new UEs or UEs with a relatively strong capability have a capability of supporting the two new features, in some cases (for example, when the UE is in poor coverage), the base station does not necessarily perform scheduling for the UE by using the two features. Whether the two features are used affects a downlink control information (Downlink Control Information, DCI) format of the UE, a discontinuous reception behavior time sequence relationship, and the like. Therefore, to avoid a scheduling failure or a transmission efficiency reduction, the base station needs to indicate whether the two capabilities are used for subsequent scheduling for the UE.

Optionally, a specific implementation of determining, by the base station according to the routing auxiliary information of the first core network, the core network and the identification information for identifying the UE by the core network is: the base station determines, according to the routing auxiliary information of the first core network, a GUMMEI of the first core network and the identification information for identifying the UE by the core network; the base station determines, according to the GUMMEI, whether core networks that can be selected by the base station include the first core network; and the base station selects the first core network if the core networks that can be selected by the base station include the first core network; or the base station selects any one of the core networks that can be selected by the base station if the core networks that can be selected by the base station do not include the first core network.

For example, the RRC connection request signaling sent by the UE to the base station carries the routing auxiliary information of the first core network, and the base station may determine, according to the routing auxiliary information of the first core network, the GUMMEI of the first core network and the identification information for identifying the UE by the core network. The base station determines, according to the GUMMEI, whether the base station can be connected to the first core network. The base station selects the first core network if the first core network exists in the core networks that can be connected to the base station; or if the first core network does not exist in the core networks that can be connected to the base station, the base station selects any one of the core networks that can be connected to the base station.

Optionally, the routing auxiliary information of the first core network includes an S-TMSI.

Optionally, the routing auxiliary information of the first core network includes at least one of the following: a selected public land mobile network address index/public land mobile network address (Public Land Mobile Network, PLMN) ID or a mobility management entity (MME) group identifier (MME group ID, MMEGI).

Optionally, the routing auxiliary information of the first core network includes the S-TMSI and the selected public land mobile network address index/PLMN ID. A specific implementation of determining, by the base station according to the routing auxiliary information of the first core network, the globally unique mobility management entity (MME) identifier (GUMMEI) of the first core network and the identification information for identifying the UE by the core network is: the base station obtains the MMEGI of the first core network from the base station according to the S-TMSI and the selected public land mobile network address index/PLMN ID; and determines, according to the S-TMSI, the selected public land mobile network address index/PLMN ID, and the MMEGI, the globally unique mobility management entity (MME) identifier (GUMMEI) of the first core network and the identification information for identifying the UE by the core network.

Specifically, a group of core networks that are previously connected to some specific UEs are not changed. That is, MMEGIs of the core networks that are connected to the UEs are not changed. The base station may store information such as MMMEIs and S-TMSIs of the UEs. In this case, the RRC connection request sent by the UE to the base station needs to carry only the selected public land mobile network address index or the PLMN ID and the S-TMSI without carrying information such as the MMEGI of the UE. The base station may obtain information such as the prestored MMEGI according to the selected public land mobile network address index/PLMN-ID and the S-TMSI, and form, according to the PLMN-ID, the S-TMSI, and the MMEGI, the GUMMEI and the identification information for identifying the UE by the core network. The base station is used to store routing auxiliary information of some core networks. The base station may obtain the routing auxiliary information by using the S-TMSI as an identification code. After the S-TMSI is updated, the core network may add the updated S-TMSI to downlink signaling sent to the base station, or may add the updated S-TMSI to some new signaling, for example, an RRC connection suspend response, S1-AP: an S1 UE deactivate context ACK in S1-AP, and an initial context establishment request. This is not limited in the present disclosure. Certainly, the S-TMSI in this embodiment of the present disclosure may also be another identifier of the UE, such as a C-RNTI. It should be noted that a method for storing information by a base station is not limited to the foregoing method, and another method for storing information by a base station, and using, as an identification code, the S-TMSI or other information updated during interaction between UE and a core network may be the foregoing method.

Optionally, the routing auxiliary information of the first core network includes the S-TMSI and the selected public land mobile network address index/PLMN ID. A specific implementation of determining, by the base station according to the routing auxiliary information of the first core network, the globally unique mobility management entity (MME) identifier (GUMMEI) of the first core network and the identification information for identifying the UE by the core network is: the base station determines the MMEGI of the first core network according to the S-TMSI and the selected public land mobile network address index/PLMN ID; and determines, according to the S-TMSI, the selected public land mobile network address index/PLMN ID, and the MMEGI, the globally unique mobility management entity (MME) identifier (GUMMEI) of the first core network and the identification information for identifying the UE by the core network.

Specifically, for some specific UEs, it is assumed that the base station belongs to only one type of core network group, that is, an MMEGI of a core network that is connected to the base station is not changed and unique. When UE changes from an idle mode to a connected mode, the UE adds the selected public land mobile network address index/PLMN-ID and the S-TMSI to RRC connection request signaling sent to the base station. When the base station connected to the UE is the same as a base station previously connected to the UE, because the MMEGI of the core network connected to the base station is unique, the base station may determine, according to the selected public land mobile network address index and the S-TMSI, the MMEGI of the core network previously connected to the UE, and the base station may form, according to the PLMN-ID, the S-TMSI, and the MMEGI, the GUMMEI of the core network previously connected to the UE and the identification information for identifying the UE by the core network. Subsequently, the base station may obtain capability information of the UE and context information of the UE by using the core network. For a specific implementation, refer to the implementation described in FIG. 3.3. Details are not described herein again.

Optionally, when the base station connected to the UE is not a base station previously connected to the UE, it needs to be indicated that the core network does not need to send the capability information of the UE to the base station. A specific indication manner is as follows: 1. 1-bit indication information may be carried in the RRC connection request signaling sent by the UE to the base station, and the indication information is used to indicate that the base station does not need to obtain the capability information of the UE according to the method described in FIG. 3.3 for obtaining the capability information of the UE. 2. Alternatively, the base station may determine, by using information carried by the UE, whether the base station needs to obtain the capability information of the UE by using the method described in FIG. 3.3 for obtaining the capability information of the UE. If the foregoing obtaining method is not used, a method in another embodiment of the present disclosure or the like may be used.

Optionally, the routing auxiliary information of the first core network includes the S-TMSI. A specific implementation of determining, by the base station according to the routing auxiliary information of the first core network, the globally unique mobility management entity (MME) identifier (GUMMEI) of the first core network is: the base station determines an MMEGI and a PLMN ID of the first core network according to the S-TMSI; and the base station determines, according to the S-TMSI, the MMEGI, and the PLMN ID, the globally unique mobility management entity (MME) identifier (GUMMEI) of the first core network and the identification information for identifying the UE by the core network.

Specifically, a group of core networks that are previously connected to some specific UEs are not changed. That is, MMEGIs of the core networks that are connected to the UEs are not changed, and the UE supports only one PLMN. In this case, the RRC connection request signaling sent by the UE to the base station carries only the S-TMSI, and the base station may determine the MMEGI and the PLMN ID of the first core network according to the S-TMSI, and then determine, according to the S-TMSI, the MMEGI, and the PLMN ID, the MME identifier (GUMMEI) of the first core network and the identification information for identifying the UE by the core network.

Optionally, the routing auxiliary information of the first core network includes the S-TMSI and the MMEGI. That the base station determines, according to the routing auxiliary information of the first core network, a globally unique mobility management entity (MME) identifier (GUMMEI) of the first core network includes: the base station determines the PLMN ID of the first core network according to the S-TMSI; and the base station determines, according to the S-TMSI, the MMEGI, and the PLMN ID, the GUMMEI of the first core network and the identification information for identifying the UE by the core network. Specifically, when the UE supports only one PLMN, the RRC connection request signaling sent by the UE to the base station carries only the S-TMSI and the MMEGI, and the base station may determine the PLMN ID of the first core network according to the S-TMSI, and then determine, according to the S-TMSI, the MMEGI, and the PLMN ID, the MME identifier (GUMMEI) of the first core network and the identification information for identifying the UE by the core network.

Optionally, the routing auxiliary information of the first core network includes the S-TMSI, the MMEGI, and the selected public land mobile network address index/PLMN ID, and that the base station determines, according to the routing auxiliary information of the first core network, a globally unique mobility management entity (MME) identifier (GUMMEI) of the first core network and the identification information for identifying the UE by the core network includes: the base station determines, according to the S-TMSI, the MMEGI, and the selected public land mobile network address index/PLMN ID, the GUMMEI of the first core network and the identification information for identifying the UE by the core network.

Optionally, the UE capability information obtaining request sent by the base station to the determined core network may carry the S-TMSI, so that the core network identifies the UE. Optionally, the UE capability information obtaining request sent by the base station to the determined core network may carry the S-TMSI, an eNB UE S1AP ID, an LTE tracking area identity (Tracking Area Identity, TAI), an evolved UMTS terrestrial radio access network (Evolved UMTS Terrestrial Radio Access Network, E-UTRAN CGI), an RRC establishment cause, and the like. When the core network sends the capability information of the UE to the base station, the capability information of the UE, a unique UE identifier of the S1 interface on the MME side (MME UE S1 Disclosure Protocol ID, MME UE S1AP ID), a unique UE identifier of the S1 interface on the eNB side (eNB UE S1 Disclosure Protocol ID, eNB UE S1AP ID), a UE aggregate maximum bit rate, and the like are carried at the same time. In this way, only a NAS PDU is carried in initial UE information signaling subsequently sent by the base station to the core network. The initial UE information signaling may be changed to uplink NAS transport signaling, and a name of the signaling is not limited herein. Certainly, after the UE sends the RRC connection request to the base station, the UE capability request signaling that is sent by the base station to the core network may also be changed to the initial UE information signaling/uplink NAS transmission information. A name of the signaling is not limited herein, and content carried in the signaling is the same as that described above.

Optionally, after the base station determines, according to the routing auxiliary information of the first core network, the core network and the identification information for identifying the UE by the core network, if a core network connected to the base station is changed, the base station sends, to a changed core network, the identification information for identifying the UE by the core network, and the identification information for identifying the UE by the core network is used by the changed core network to ask the first core network for the context information of the UE.

For example, referring to FIG. 3.4, FIG. 3.4 is a schematic flowchart of another data scheduling method according to an embodiment of the present disclosure.

Optionally, a specific implementation of obtaining the capability information of the user equipment (UE) by the base station is: the base station receives a connection establishment request or a connection re-establishment request that is sent by the UE and that carries routing auxiliary information of a first base station, where the first base station is a base station that stores routing auxiliary information of a second core network, and the second core network is a core network that stores context information of the UE; the base station asks the first base station for the routing auxiliary information of the second core network according to the routing auxiliary information of the first base station; the base station determines, according to the routing auxiliary information of the second core network, a core network and identification information for identifying the UE by the core network; the base station sends a UE context information obtaining request to the determined core network, where the UE context information obtaining request carries the identification information for identifying the UE by the core network, the identification information for identifying the UE by the core network is used by the determined core network to obtain the context information of the UE, and the context information of the UE includes the capability information of the UE; and the base station receives the context information that is of the UE and that is sent by the determined core network in response to the UE context information obtaining request.

The routing auxiliary information of the first base station includes a cell radio network temporary identifier (Cell Radio Network Temporary Identifier, C-RNTI), a physical cell identifier, and an S-TMSI.

For example, when a connection between the UE and a base station connected to the UE fails, a connection re-establishment operation is performed between the UE and a new base station. The UE carries the C-RNTI, the physical cell identifier, and the S-TMSI, and initiates a connection re-establishment procedure to the new base station, so that the new base station finds, according to the foregoing information, the base station previously connected to the UE, obtains, by using an X2 interface from the base station previously connected to the UE, routing auxiliary information of a core network (the second core network) previously connected to the UE, such as an MMEGI of the core network, obtains information about the core network previously connected to the UE, and further obtains the context information of the UE by using the core network previously connected to the UE, thereby implementing the connection re-establishment procedure. The context information of the UE includes the capability information of the UE. For a specific process of obtaining the context information of the UE by the base station, refer to the method described in FIG. 3.3, and details are not described herein again. If a base station that is currently connected to the UE is the same as the base station previously connected to the UE, procedures for obtaining the context information of the UE are the same.

S302. The base station allocates a data scheduling resource to the UE according to the capability information of the UE.

Specifically, after receiving the capability information of the UE, the base station allocates the data scheduling resource to the UE according to the capability information of the UE, and sends RRC connection establishment signaling to the UE. The RRC connection establishment signaling carries the data scheduling resource allocated by the base station to the UE. After receiving the RRC connection establishment signaling, the UE sends RRC connection establishment complete signaling, and according to the data scheduling resource allocated by the base station to the UE, adds data that needs to be reported to a network by the UE to a NAS message sent at this moment.

For example, the capability information of the UE includes a CP/UP indication. The base station correspondingly sets a PDCP header in subsequent data transmission or signaling transmission. For example, a PDCP header is short when a CP is used for data transmission, while a PDCP header is long when a UP transmission solution is used. The CP/UP indication includes the following: 1. An indication is given by using a Packet Data Convergence Protocol (Packet Data Convergence Protocol, PDCP) header of the RRC connection establishment complete signaling sent by the UE to the base station. A PDCP header with fewer bytes (for example, 1 byte) has no MAC-I, and is used to indicate that a CP is used for data transmission, and a PDCP header with more bytes (for example, 5 bytes) has a MAC-I, and is used to indicate that a UP is used for data transmission. 2. If a base station connected to the UE is the same as a base station previously connected to the UE, a short PDCP header is used to send an RRC connection request. If there is a context of the UE on a base station side, it indicates that a UP is used for data transmission, and the base station performs subsequent related configuration according to a UP feature. If there is no context of the UE on a base station side, the base station performs subsequent related configuration according to a CP feature. 3. If a base station connected to the UE is different from a base station previously connected to the UE, a short PDCP header is still used to send RRC connection establishment complete signaling. If there is no context information of the UE on a base station side, the base station still uses related configuration of the CP. After the UE sends the RRC connection establishment complete signaling, the base station may determine, according to a size of a NAS packet, whether a CP or a UP is used, and perform subsequent configuration. 4. Similarly, a long PDCP header may also be used for the second and the third CP/UP indication, and subsequent UP/CP configuration for the use of the long PDCP header for the second and the third CP/UP indication is the same as that for the second and the third CP/UP indication, and details are not described herein again. 5. If whether a CP or a UP is used cannot be recognized according to a size of a data packet, after receiving the packet, the core network notifies the base station by using downlink signaling, to perform subsequent data transmission. That is, after the UE exchanges information with the core network, and whether a CP or a UP is specifically selected is learned, the core network delivers downlink signaling to the base station, to notify the base station of whether a CP or a UP is used.

It may be learned that in this embodiment of the present disclosure, a base station obtains capability information of UE. A moment of obtaining the capability information of the UE by the base station is prior to that of receiving, by the base station, radio resource control (RRC) connection establishment complete signaling that is sent by the UE to the base station. When data transmission is performed based on a CP transmission solution, data is carried in a NAS message that is carried in the RRC connection establishment complete signaling sent by the UE to the base station. Therefore, the base station obtains the capability information of the UE before the UE sends the data, so that the base station can properly allocate a data scheduling resource to the UE according to the capability information of the UE, and resource utilization is increased.

Consistent with the technical solution described above, in a specific embodiment, FIG. 4 is a schematic flowchart of a data scheduling method including a specific execution process of a base station. Although the data scheduling described herein is executed by the base station shown in FIG. 2, it should be noted that a specific execution environment of the data scheduling method disclosed in this embodiment of the present disclosure is not limited to the base station.

Figure 4:
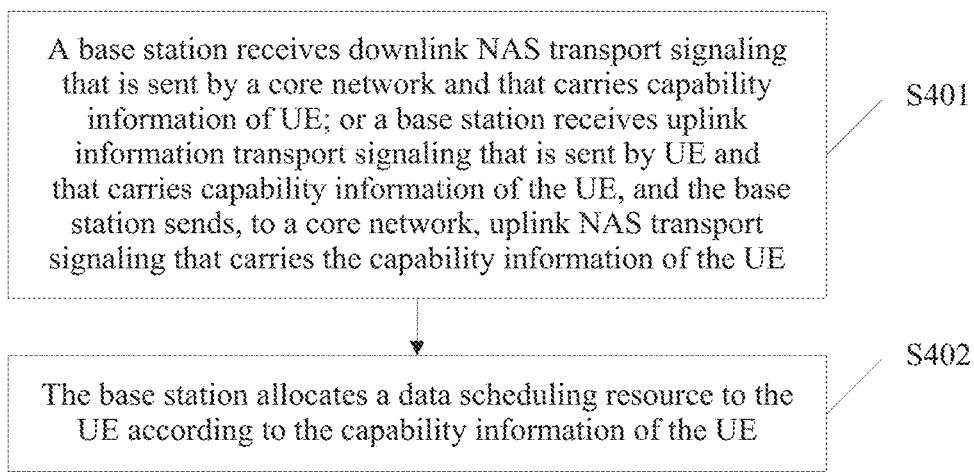
FIG. 4 shows a schematic flowchart of another data scheduling method according to an embodiment of the present disclosure.

As shown in FIG. 4, the data scheduling method disclosed in this method embodiment of the present disclosure specifically includes the following steps:

S401. A base station receives downlink NAS transport signaling that is sent by a core network and that carries capability information of UE; or a base station receives uplink information transport signaling that is sent by UE and that carries capability information of the UE, and the base station sends, to a core network, uplink NAS transport signaling that carries the capability information of the UE.

S402. The base station allocates a data scheduling resource to the UE according to the capability information of the UE.

Specifically, this embodiment of the present disclosure is mainly applied to a CP data transmission background. After a connection between the UE and a network side (the base station or the core network) is completed, and a connection between the base station and the core network is completed, if the core network needs to deliver downlink data, the core network may add not only a NAS PDU but also a new information element (information element, IE) to the downlink NAS transport signaling sent to the base station, to transmit the capability information of the UE. In this way, the core network sends the downlink data together with the capability information of the UE to the base station, thereby reducing usage of dedicated signaling, for example, initial context establishment request signaling. Alternatively, after the UE is connected to a network side, when the UE has uplink data to be transmitted to the base station, the UE adds the capability information of the UE to the uplink information transport signaling and a NAS PDU that are sent to the base station, and transfers the capability information of the UE to the base station. The base station sends the capability information of the UE to the core network. This process may be used as a process of updating the capability information of the UE.

Optionally, after RRC establishment is completed, the base station may add indication information and an identifier for searching for a UE context to an initial UE context sent to the core network, and the indication information is used to instruct the core network to deliver the capability information of the UE to the base station. After receiving the indication information, the core network may send the capability information of the UE to the base station by using downlink signaling subsequently sent to the base station by the core network, and a name of the signaling is not limited in the present disclosure.

Optionally, after the base station sends the initial UE context to the core network, the base station may ask the core network for the capability information of the UE by using signaling sent to the core network. The capability information of the UE may be sent to the base station by using downlink signaling subsequently sent to the base station by the core network, and a name of the signaling is not limited in the present disclosure.

Optionally, the core network may add the capability information of the UE to downlink data sent to the base station.

Optionally, the base station does not need to instruct the core network to send the capability information of the UE to the base station, and the core network may directly add the capability information of the UE to signaling.

It may be learned that in this embodiment of the present disclosure, capability information that is of UE and that is obtained by a base station is carried in uplink transport signaling sent by the UE to the base station, or is carried in other data or signaling sent by a core network to the base station. In contrast, in the prior art, capability information of UE is carried in dedicated signaling (such as initial context establishment request signaling) sent by a core network to a base station. It may be learned that in this embodiment of the present disclosure, the capability information of the UE is carried in data transmission. This reduces dedicated signaling, and further reduces power consumption.

Consistent with the technical solution described above, in a specific embodiment, FIG. 5 is a schematic flowchart of a connection release method including a specific execution process of UE, a base station, and a core network. Although the data scheduling described herein is executed based on the UE, the base station, and the core network shown in FIG. 1, it should be noted that a specific execution environment of the connection release method disclosed in this embodiment of the present disclosure is not limited to the UE, the base station, and the core network.

Figure 5:
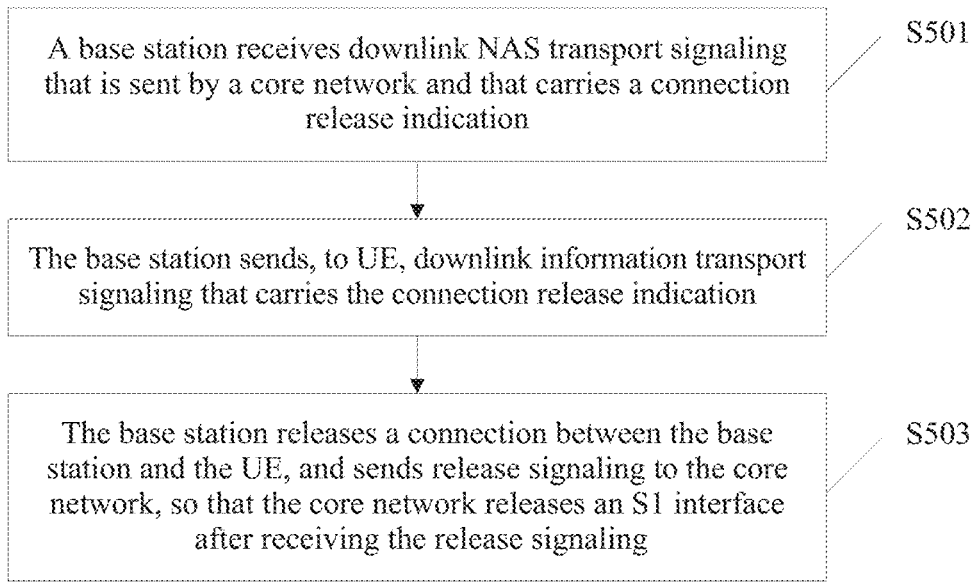
FIG. 5 shows a schematic flowchart of a connection release method according to an embodiment of the present disclosure.

As shown in FIG. 5, the connection release method disclosed in this method embodiment of the present disclosure specifically includes the following steps:

S501. A base station receives downlink NAS transport signaling that is sent by a core network and that carries a connection release indication.

S502. The base station sends, to UE, downlink information transport signaling that carries the connection release indication.

S503. The base station releases a connection between the base station and the UE, and sends release signaling to the core network, so that the core network releases an S1 interface after receiving the release signaling.

Specifically, when uplink data transmission is completed, release auxiliary information may be added to finally sent NAS information, to indicate whether a downlink data feedback is required. When a downlink feedback is not required, after the core network receives data, the core network triggers an S1 interface release procedure. If the uplink data transmission indicates that downlink feedback information is required, an IE may be added to the downlink NAS transport signaling sent by the core network to the base station, to instruct the base station to perform release after data transmission is completed, and a connection release indication is added to a NAS PDU transmitted during data transmission. After receiving the information, the base station performs a release operation after learning that transmission is completed. The base station sends, to the UE, the downlink information transport signaling that carries the connection release indication. The UE receives a downlink direct transfer message sent by the base station, and performs release according to indication information in the NAS PDU. After sending, to the UE, the downlink information transport signaling that carries the connection release indication, the base station sends release signaling to the core network, so that the core network releases the S1 interface after receiving the release signaling. A specific name of the release signaling is not limited.

Optionally, the connection release indication sent by the core network to the base station may be added to a MAC header of air-interface signaling.

Optionally, in uplink data transmission, if an indication that a downlink feedback that includes release indication information is required is not given in an uplink packet, and if there is no data transmission in a time period, the base station or the core network may trigger connection release. If the base station triggers a release procedure, the base station sends release indication information to the UE, and then sends an S1 interface release acknowledgement (indication) to the core network. If the core network triggers a release procedure, the release procedure is the same as an existing UE context release procedure, and details are not described herein.

Optionally, in downlink transmission, if the core network has transmitted one data packet, a timer is enabled, and if the timer expires, a network side enters a normal connection release procedure. If an uplink feedback is required, the release procedure can also be performed. If the timer does not expire, the UE has an uplink packet to be sent, and the release procedure can also be applied herein. That is, the UE may trigger the network side at any time to release the connection, or the core network may continue to wait for the timer to expire after completing data transmission. If the network side learns that a data packet transmitted by the UE is the last data packet, the network side may add a field to the downlink NAS transport signaling, to instruct the base station to release a connection, and add the release indication information to the NAS PDU, and the base station transfers the release indication information by means of downlink information transmission.

It may be learned that in this embodiment of the present disclosure, a connection release indication sent by a core network to a base station is carried in downlink NAS transport signaling sent by the core network to the base station. In contrast, in the prior art, a connection release indication is carried in dedicated signaling sent by a core network to a base station. It may be learned that in this embodiment of the present disclosure, the connection release indication is carried in data transmission. This reduces dedicated signaling, and further reduces power consumption.

Figure 6:
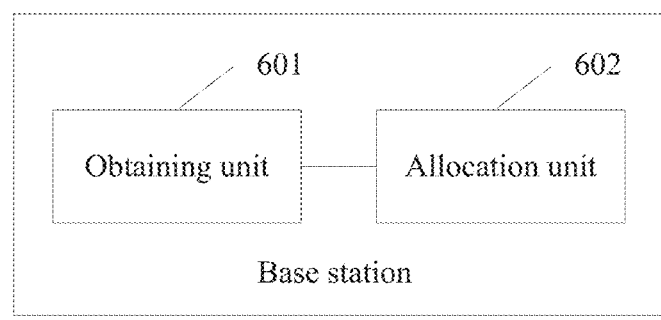
FIG. 6 shows a schematic structural diagram of another base station according to an embodiment of the present disclosure.

FIG. 6 is a schematic structural diagram of a base station according to an embodiment of the present disclosure. The base station 600 includes an obtaining unit 601 and an allocation unit 602.

The obtaining unit 601 is configured to obtain capability information of user equipment (UE), where a moment of obtaining the capability information of the UE is prior to that of receiving, by the base station, radio resource control (RRC) connection establishment complete signaling that is sent by the UE to the base station.

The allocation unit 602 is configured to allocate a data scheduling resource to the UE according to the capability information of the UE.

Optionally, the obtaining unit 601 is specifically configured to:
receive an RRC connection request that is sent by the UE and that carries the capability information of the UE; or
receive a paging message that is sent by a core network and that carries the capability information of the UE; or
receive a first paging message sent by a core network; if the first paging message does not carry the capability information of the UE, send, to the UE, a second paging message that carries indication information, where the indication information is used to instruct the UE to report the capability information of the UE; and receive an RRC connection request that is sent by the UE and that carries the capability information of the UE.

Optionally, after the obtaining unit 601 obtains the capability information of the user equipment (UE), the base station further includes a third receiving unit and a fourth sending unit.

The third receiving unit is configured to: when the capability information is first capability information, receive an initial context establishment request that is sent by a core network and that carries the second capability information; or receive downlink non-access stratum (NAS) transport signaling that is sent by a core network and that carries the fourth capability information; or receive RRC connection establishment complete signaling that is sent by the UE and that carries the fifth capability information.

The fourth sending unit is configured to: when the capability information is the first capability information, send a UE capability information obtaining request to the UE, and receive the third capability information that is sent by the UE in response to the UE capability information obtaining request.

Optionally, the capability information includes first capability information, and the capability information further includes second capability information, third capability information, fourth capability information, or fifth capability information.

The obtaining unit 601 is specifically configured to receive an RRC connection request that is sent by the UE and that carries the first capability information; and receive an initial context establishment request that is sent by a core network and that carries the second capability information.

Alternatively, the obtaining unit 601 is specifically configured to: receive an RRC connection request that is sent by the UE and that carries the first capability information; send a UE capability information obtaining request to the UE; and receive the third capability information that is sent by the UE in response to the UE capability information obtaining request.

Alternatively, the obtaining unit 601 is specifically configured to: receive an RRC connection request that is sent by the UE and that carries the first capability information; and receive downlink non-access stratum (NAS) transport signaling that is sent by a core network and that carries the fourth capability information.

Alternatively, that the obtaining unit 601 is specifically configured to obtain the capability information of the user equipment (UE) includes: the base station receives an RRC connection request that is sent by the UE and that carries the first capability information; and receives RRC connection establishment complete signaling that is sent by the UE and that carries the fifth capability information.

Optionally, the obtaining unit 601 includes:
a first receiving unit, configured to receive an RRC connection request sent by the UE, where the RRC connection request carries routing auxiliary information of a first core network, and the first core network is a core network that stores context information of the UE; a first determining unit, configured to determine, according to the routing auxiliary information of the first core network, a core network and identification information for identifying the UE by the core network; and a first sending unit, configured to send a UE capability information obtaining request to the determined core network, where the UE capability information obtaining request carries the identification information for identifying the UE by the core network, the identification information for identifying the UE by the core network is used by the determined core network to obtain the context information of the UE, and the context information of the UE includes the capability information of the UE, where the first receiving unit is further configured to receive the capability information that is of the UE and that is sent by the determined core network in response to the UE capability information obtaining request.

Optionally, after the first receiving unit receives the capability information that is of the UE and that is sent by the determined core network in response to the UE capability information obtaining request, the base station further includes a fifth sending unit, configured to send UE capability usage indication information to the UE, where the UE capability usage indication information is used to indicate a UE capability used in data scheduling, and the UE capability usage indication information includes indication information for indicating whether a multi-process HARQ is used in data scheduling, and/or indication information for indicating whether a large transport block size (TBS) is used in data scheduling.

Optionally, the first determining unit includes:
a second determining unit, configured to determine, according to the routing auxiliary information of the first core network, a globally unique mobility management entity (MME) identifier (GUMMEI) of the first core network and the identification information for identifying the UE by the core network; a third determining unit, configured to determine, according to the GUMMEI, whether core networks that can be selected by the base station include the first core network; and a first selection unit, configured to select the first core network if the core networks that can be selected by the base station include the first core network, where the first selection unit is further configured to: if the core networks that can be selected by the base station do not include the first core network, select any one of the core networks that can be selected by the base station.

Optionally, the routing auxiliary information of the first core network includes a System Architecture Evolution (SAE)-temporary mobile subscriber identity (S-TMSI).

Optionally, the routing auxiliary information of the first core network further includes at least one of the following: a selected public land mobile network address index/public land mobile network address (PLMN ID) or a mobility management entity (MME) group identifier (MMEGI).

Optionally, the routing auxiliary information of the first core network includes the S-TMSI and the selected public land mobile network address index/PLMN ID, and the second determining unit is specifically configured to:
obtain the MMEGI of the first core network from the base station according to the S-TMSI and the selected public land mobile network address index/PLMN ID; and determine, according to the S-TMSI, the selected public land mobile network address index/PLMN ID, and the MMEGI, the globally unique mobility management entity (MME) identifier (GUMMEI) of the first core network and the identification information for identifying the UE by the core network.

Optionally, the routing auxiliary information of the first core network includes the S-TMSI, and the second determining unit is specifically configured to:
determine an MMEGI and a PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

Optionally, the routing auxiliary information of the first core network includes the S-TMSI and the MMEGI, and the second determining unit is specifically configured to:
determine the PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

Optionally, the routing auxiliary information of the first core network includes the S-TMSI, the MMEGI, and the selected public land mobile network address index/PLMN ID, and the second determining unit is specifically configured to:
determine, according to the S-TMSI, the MMEGI, and the selected public land mobile network address index/PLMN ID, the globally unique mobility management entity (MME) identifier (GUMMEI) of the first core network and the identification information for identifying the UE by the core network.

Optionally, the base station described in FIG. 6 further includes:
a second sending unit, configured to: if a core network connected to the base station is changed, send the identification information for identifying the UE by the core network to a changed core network, where the identification information for identifying the UE by the core network is used by the changed core network to ask the first core network for the context information of the UE.

Optionally, the obtaining unit 601 includes:
a second receiving unit, configured to receive a connection establishment request or a connection re-establishment request that is sent by the UE and that carries routing auxiliary information of a first base station, where the first base station is a base station that stores routing auxiliary information of a second core network, and the second core network is a core network that stores context information of the UE; an asking unit, configured to ask the first base station for the routing auxiliary information of the second core network according to the routing auxiliary information of the first base station; a fourth determining unit, configured to determine, according to the routing auxiliary information of the second core network, a core network and identification information for identifying the UE by the core network; and a third sending unit, configured to send a UE context information obtaining request to the determined core network, where the UE context information obtaining request carries the identification information for identifying the UE by the core network, the identification information for identifying the UE by the core network is used by the determined core network to obtain the context information of the UE, and the context information of the UE includes the capability information of the UE, where the second receiving unit is further configured to receive the context information that is of the UE and that is sent by the determined core network in response to the UE context information obtaining request.

Optionally, the capability information includes at least one of the following: single-band/multi-band deployment (one band/multi-band deployment), a single-tone/multi-tone indication (single-tone/multi-tone indication), a control plane/user plane indication (CP/UP) indication, a UE category (UE-category), a radio capability (radio capability), a subscriber profile identifier (SPID), access stratum release information (access stratum release), a multi-process HARQ capability, a large TBS capability, a new power type, a mobility enhancement indication, a control plane re-establishment capability, or a re-establishment indication.

Optionally, the UE category (UE-category) includes UE that supports or needs a multi-process HARQ and/or UE that supports or needs a large TBS.

Optionally, the new power type is included in a MAC protocol data unit control element (MAC CE) that carries the RRC connection establishment request.

Optionally, the re-establishment includes a user plane (UP) re-establishment indication and/or a control plane (CP) re-establishment indication, the UP re-establishment indication is an indication used to indicate whether mobility enhancement is supported after re-establishment, and the CP re-establishment indication is used to indicate that connection re-establishment is used for CP re-establishment, or is used to distinguish between the CP indication and the UP indication.

Optionally, the re-establishment indication is carried in a message sent by the UE to the base station, and the message includes an RRC connection re-establishment request.

Optionally, the re-establishment indication is further used as an establishment cause value for indication.

Optionally, before the obtaining unit 601 obtains the capability information of the user equipment (UE), the base station further includes a processing unit.

The processing unit is configured to broadcast an indication of whether the base station supports mobility enhancement.

In this embodiment, the base station 600 may be presented in a form of a functional unit. The "unit" herein may be an disclosure-specific integrated circuit (disclosure-specific integrated circuit, ASIC), a circuit, a processor that executes one or more software or firmware programs and a memory, an integrated logic circuit, and/or another device that may provide the foregoing functions. In a simple embodiment, persons skilled in the art may figure out that the base station 600 may be in a form shown in FIG. 2. The obtaining unit 601 and the allocation unit 602 may be implemented by using the processor and the memory in FIG. 2.

Figure 7:
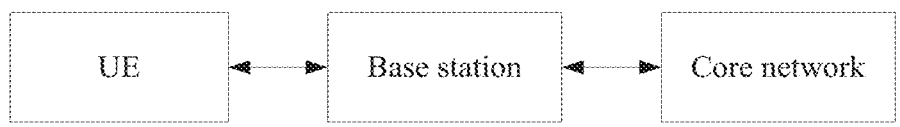
FIG. 7 shows a schematic structural diagram of a communications system according to an embodiment of the present disclosure.

FIG. 7 is a schematic structural diagram of a communications system according to an embodiment of the present disclosure. As shown in FIG. 7, the communications system includes UE, a core network, and a base station.

The base station is configured to obtain capability information of the UE, where a moment of obtaining the capability information of the UE is prior to that of receiving, by the base station, radio resource control (RRC) connection establishment complete signaling that is sent by the UE to the base station; and allocate a data scheduling resource to the UE according to the capability information of the UE.

In an embodiment, the UE is configured to send, to the base station, an RRC connection request that carries the capability information of the UE. A specific implementation of obtaining the capability information of the user equipment (UE) by the base station is: the base station is configured to receive the RRC connection request that is sent by the UE and that carries the capability information of the UE.

Alternatively, the core network is configured to send, to the base station, a paging message that carries the capability information of the UE. A specific implementation of obtaining the capability information of the user equipment (UE) by the base station is: the base station is configured to receive the paging message that is sent by the core network and that carries the capability information of the UE.

Alternatively, the core network is configured to send a first paging message to the base station; the base station is configured to receive the first paging message sent by the core network; the base station is further configured to: if the first paging message does not carry the capability information of the UE, send, to the UE, a second paging message that carries indication information, where the indication information is used to instruct the UE to report the capability information of the UE; the UE is configured to receive the second paging message that is sent by the base station and that carries the indication information; the UE is further configured to send, to the base station, an RRC connection request that carries the capability information of the UE. A specific implementation of obtaining the capability information of the user equipment (UE) by the base station is: the base station is configured to receive the RRC connection request that is sent by the UE and that carries the capability information of the UE.

In an embodiment, the capability information is first capability information, and after the base station obtains the capability information of the user equipment (UE), the core network is configured to send, to the base station, an initial context establishment request that carries the second capability information; and the base station is further configured to receive the initial context establishment request that is sent by the core network and that carries the second capability information.

Alternatively, the base station is further configured to send a UE capability information obtaining request to the UE; the UE is further configured to receive the UE capability information obtaining request sent by the base station; the UE is further configured to send the third capability information to the base station in response to the UE capability information obtaining request; and the base station is further configured to receive the third capability information that is sent by the UE in response to the UE capability information obtaining request.

Alternatively, the core network is configured to send, to the base station, downlink non-access stratum (NAS) transport signaling that carries the fourth capability information; and the base station is further configured to receive the downlink non-access stratum (NAS) transport signaling that is sent by the core network and that carries the fourth capability information.

Alternatively, the UE is further configured to send, to the base station, RRC connection establishment complete signaling that carries the fifth capability information; and the base station is further configured to receive the RRC connection establishment complete signaling that is sent by the UE and that carries the fifth capability information.

In an embodiment, the capability information includes first capability information, and the capability information further includes second capability information, third capability information, fourth capability information, or fifth capability information.

The UE is configured to send, to the base station, an RRC connection request that carries the first capability information; the core network is configured to send, to the base station, an initial context establishment request that carries the second capability information. A specific implementation of obtaining the capability information of the user equipment (UE) by the base station is: the base station is configured to receive the RRC connection request that is sent by the UE and that carries the first capability information; and the base station is further configured to receive the initial context establishment request that is sent by the core network and that carries the second capability information.

Alternatively, the UE is configured to send, to the base station, an RRC connection request that carries the first capability information; the base station is configured to send a UE capability information obtaining request to the UE; the UE is further configured to receive the UE capability information obtaining request sent by the base station; the UE is further configured to send the third capability information to the base station in response to the UE capability information obtaining request. A specific implementation of obtaining the capability information of the user equipment (UE) by the base station is: the base station is configured to receive the RRC connection request that is sent by the UE and that carries the first capability information; and the base station is further configured to receive the third capability information that is sent by the UE in response to the UE capability information obtaining request.

Alternatively, the UE is configured to send, to the base station, an RRC connection request that carries the first capability information; the core network is configured to send, to the base station, downlink non-access stratum (NAS) transport signaling that carries the fourth capability information. A specific implementation of obtaining the capability information of the user equipment (UE) by the base station is: the base station is configured to receive the RRC connection request that is sent by the UE and that carries the first capability information; and the base station is further configured to receive the downlink non-access stratum (NAS) transport signaling that is sent by the core network and that carries the fourth capability information.

Alternatively, the UE is configured to send, to the base station, an RRC connection request that carries the first capability information; the UE is further configured to send, to the base station, RRC connection establishment complete signaling that carries the fifth capability information. A specific implementation of obtaining the capability information of the user equipment (UE) by the base station is: the base station is configured to receive the RRC connection request that is sent by the UE and that carries the first capability information; and the base station is further configured to receive the RRC connection establishment complete signaling that is sent by the UE and that carries the fifth capability information.

In an embodiment, the UE is configured to send an RRC connection request to the base station, where the RRC connection request carries routing auxiliary information of a first core network, and the first core network is a core network that stores context information of the UE. A specific implementation of obtaining the capability information of the user equipment (UE) by the base station is:

the base station is configured to receive the RRC connection request sent by the UE; the base station is further configured to: determine, according to the routing auxiliary information of the first core network, a core network and identification information for identifying the UE by the core network; send a UE capability information obtaining request to the determined core network, where the UE capability information obtaining request carries the identification information for identifying the UE by the core network, the identification information for identifying the UE by the core network is used by the determined core network to obtain the context information of the UE, and the context information of the UE includes the capability information of the UE; and receive the capability information that is of the UE and that is sent by the determined core network in response to the UE capability information obtaining request.

In an embodiment, after the base station receives the capability information that is of the UE and that is sent by the determined core network to respond the UE capability information obtaining request, the base station is further configured to send UE capability usage indication information to the UE, where the UE capability usage indication information is used to indicate a UE capability used in data scheduling, and the UE capability usage indication information includes indication information for indicating whether a multi-process HARQ is used in data scheduling, and/or indication information for indicating whether a large transport block size (TBS) is used in data scheduling.

In an embodiment, a specific implementation of determining, by the base station according to the routing auxiliary information of the first core network, the core network and the identification information for identifying the UE by the core network is:

the base station is configured to: determine, according to the routing auxiliary information of the first core network, a globally unique mobility management entity (MME) identifier (GUMMEI) of the first core network and the identification information for identifying the UE by the core network; determine, according to the GUMMEI, whether core networks that can be selected by the base station include the first core network; and select the first core network if the core networks that can be selected by the base station include the first core network; or if the core networks that can be selected by the base station do not include the first core network, select any one of the core networks that can be selected by the base station.

In an embodiment, the routing auxiliary information of the first core network includes a System Architecture Evolution (SAE)-temporary mobile subscriber identity (S-TMSI).

In an embodiment, the routing auxiliary information of the first core network further includes at least one of the following: a selected public land mobile network address index/public land mobile network address (PLMN ID) or a mobility management entity (MME) group identifier (MMEGI).

In an embodiment, the routing auxiliary information of the first core network includes the S-TMSI and the selected public land mobile network address index/PLMN ID. A specific implementation of determining, by the base station according to the routing auxiliary information of the first core network, the globally unique mobility management entity (MME) identifier (GUMMEI) of the first core network and the identification information for identifying the UE by the core network is:

the base station is configured to obtain the MMEGI of the first core network from the base station according to the S-TMSI and the selected public land mobile network address index/PLMN ID; and determine, according to the S-TMSI, the selected public land mobile network address index/PLMN ID, and the MMEGI, the globally unique mobility management entity (MME) identifier (GUMMEI) of the first core network and the identification information for identifying the UE by the core network.

In an embodiment, a specific implementation of determining, by the base station according to the routing auxiliary information of the first core network, the globally unique mobility management entity (MME) identifier (GUMMEI) of the first core network and the identification information for identifying the UE by the core network is:

the base station is configured to determine an MMEGI and a PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

In an embodiment, the routing auxiliary information of the first core network includes the S-TMSI and the MMEGI. A specific implementation of determining, by the base station according to the routing auxiliary information of the first core network, the globally unique mobility management entity (MME) identifier (GUMMEI) of the first core network and the identification information for identifying the UE by the core network is:

the base station is configured to determine the PLMN ID of the first core network according to the S-TMSI; and determine, according to the S-TMSI, the MMEGI, and the PLMN ID, the globally unique mobility management entity (MME) identifier (GUMMEI) of the first core network and the identification information for identifying the UE by the core network.

In an embodiment, the routing auxiliary information of the first core network includes the S-TMSI, the MMEGI, and the selected public land mobile network address index/PLMN ID. A specific implementation of determining, by the base station according to the routing auxiliary information of the first core network, the globally unique mobility management entity (MME) identifier (GUMMEI) of the first core network and the identification information for identifying the UE by the core network is:

the base station is configured to determine, according to the S-TMSI, the MMEGI, and the selected public land mobile network address index/PLMN ID, the globally unique mobility management entity (MME) identifier (GUMMEI) of the first core network and the identification information for identifying the UE by the core network.

In an embodiment, after the base station determines, according to the routing auxiliary information of the first core network, the core network and the identification information for identifying the UE by the core network, the base station is further configured to:

if a core network connected to the base station is changed, send the identification information for identifying the UE by the core network to a changed core network, where the identification information for identifying the UE by the core network is used by the changed core network to ask the first core network for the context information of the UE.

In an embodiment, the UE is configured to send, to the base station, a connection establishment request or a connection re-establishment request that carries routing auxiliary information of a first base station, where the first base station is a base station that stores routing auxiliary information of a second core network, and the second core network is a core network that stores context information of the UE. A specific implementation of obtaining the capability information of the user equipment (UE) by the base station is:

the base station is configured to receive the connection establishment request or the connection re-establishment request that is sent by the UE and that carries the routing auxiliary information of the first base station; and the base station is further configured to: ask the first base station for the routing auxiliary information of the second core network according to the routing auxiliary information of the first base station; determine, according to the routing auxiliary information of the second core network, a core network and identification information for identifying the UE by the core network; send a UE context information obtaining request to the determined core network, where the UE context information obtaining request carries the identification information for identifying the UE by the core network, the identification information for identifying the UE by the core network is used by the determined core network to obtain the context information of the UE, and the context information of the UE includes the capability information of the UE; and receive the context information that is of the UE and that is sent by the determined core network in response to the UE context information obtaining request.

In an embodiment, the capability information includes at least one of the following: single-band/multi-band deployment (one band/multi-band deployment), a single-tone/multi-tone indication (single-tone/multi-tone indication), a control plane/user plane indication (CP/UP) indication, a UE category (UE-category), a radio capability (radio capability), a subscriber profile identifier (SPID), access stratum release information (access stratum release), a multi-process HARQ capability, a large TBS capability, a new power type, a mobility enhancement indication, a control plane re-establishment capability, or a re-establishment indication.

In an embodiment, the UE category (UE-category) includes UE that supports or needs a multi-process HARQ and/or UE that supports or needs a large TBS.

In an embodiment, the new power type is included in a MAC protocol data unit control element (MAC CE) that carries the RRC connection establishment request.

In an embodiment, the re-establishment includes a user plane (UP) re-establishment indication and/or a control plane (CP) re-establishment indication, the UP re-establishment indication is an indication used to indicate whether mobility enhancement is supported after re-establishment, and the CP re-establishment indication is used to indicate that connection re-establishment is used for CP re-establishment, or is used to distinguish between the CP indication and the UP indication.

In an embodiment, the re-establishment indication is carried in a message sent by the UE to the base station, and the message includes an RRC connection re-establishment request.

In an embodiment, the re-establishment indication is further used as an establishment cause value for indication.

In an embodiment, before obtaining the capability information of the user equipment (UE) by the base station, the base station is further configured to broadcast an indication of whether the base station supports mobility enhancement.

It may be understood that the UE, the core network, and the base station that are included in the communications system in this embodiment may be specifically implemented according to the method embodiment in FIG. 3. For a specific implementation process, refer to related descriptions in the method embodiment in FIG. 3, and details are not described herein again.

An embodiment of the present disclosure further provides a computer storage medium. The computer storage medium may store a program. When being executed, the program includes some or all of the steps of any data scheduling method and a connection release method that are recorded in the foregoing method embodiments.

It should be noted that, for brief description, the foregoing method embodiments are expressed as a series of actions. However, persons skilled in the art should appreciate that the present disclosure is not limited to the described action sequence, and because according to the present disclosure, some steps may be performed in other sequences or performed simultaneously. In addition, persons skilled in the art should also appreciate that all the embodiments described in the specification are embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this disclosure, it should be understood that the disclosed apparatus may be implemented in other manners. For example, the described apparatus embodiment is merely an example. For example, the unit division is merely logical function division and may be other division in an actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present disclosure essentially, or the part contributing to the prior art, or all or some of the technical solutions may be implemented in the form of a software product. The computer software product is stored in a memory and includes several instructions for instructing a computer device (which may be a personal computer, a server, a network device, or the like) to perform all or some of the steps of the methods described in the embodiments of the present disclosure. The foregoing memory includes: any medium that can store program code, such as a USB flash drive, a read-only memory (ROM, Read-Only Memory), a random access memory (RAM, Random Access Memory), a removable hard disk, a magnetic disk, or an optical disc.

Persons of ordinary skill in the art may understand that all or some of the steps of the methods in the embodiments may be implemented by a program instructing relevant hardware. The program may be stored in a computer readable memory. The memory may include a flash memory, a read-only memory (English: Read-Only Memory, ROM for short), a random access memory (English: Random Access Memory, RAM for short), a magnetic disk, an optical disc, and the like.

The embodiments of the present disclosure are described in detail above. The principle and implementation of the present disclosure are described herein through specific examples. The description about the embodiments is merely provided to help understand the method and core ideas of the present disclosure. In addition, persons of ordinary skill in the art can make modifications in terms of the specific implementations and disclosure scopes according to the ideas of the present disclosure. In conclusion, the content of the specification shall not be construed as a limit to the present disclosure.

What is claimed is:

1. A data scheduling method, comprising:
   receiving first capability information of a terminal device, wherein the first capability information comprises a multi-tone indication indicating that the terminal device supports multi-tone, wherein the multi-tone indication indicating that the terminal device supports multi-tone is used to allocate a data scheduling resource for a data transmission of the terminal device through a control plane;
   indicating the data scheduling resource to the terminal device; and
   receiving, on the data scheduling resource, a radio resource control (RRC) connection establishment complete signaling, wherein the RRC connection establishment complete signaling comprises a non-access stratum (NAS) message, and the NAS message comprises data and NAS signaling sent by the terminal device.

2. The data scheduling method according to claim 1, wherein a moment of receiving the first capability information is prior to a moment of receiving the RRC connection establishment complete signaling.

3. The data scheduling method according to claim 1, wherein the receiving the first capability information of the terminal device comprises:
   receiving, from the terminal device, a RRC connection request comprising the first capability information.

4. The data scheduling method according to claim 1, wherein:
   the data scheduling method further comprises:
      receiving, from the terminal device, a RRC connection request comprising a system architecture evolution temporary mobile subscriber identity (S-TMSI) of the terminal device;
      determining a core network according to the S-TMSI; and
      sending a capability information obtaining request to the core network, wherein the capability information obtaining request includes the S-TMSI; and
   the receiving the first capability information of the terminal device comprises:
      receiving, from the core network, the first capability information of the terminal device.

5. The data scheduling method according to claim 1, wherein the first capability information comprises at least one of the following information:
   a control plane/user plane indication, a user equipment (UE) category,
a radio capability,
a subscriber profile identifier,
access stratum release information,
a multi-process hybrid automatic repeat request (HARQ) capability,
a large transport block size (TBS) capability,
a new power type,
a mobility enhancement indication,
a control plane re-establishment capability, or
a re-establishment indication.

6. The data scheduling method according to claim 1, wherein the RRC connection establishment complete signaling comprises second capability information of the terminal device, wherein the second capability information comprises a user plane indication.

7. The data scheduling method according to claim 1, wherein the data scheduling method further comprises:
sending indication information to the terminal device for indicating whether a multi-process HARQ is used in data scheduling.

8. A data scheduling method, comprising:
sending, to a base station, first capability information of a terminal device, wherein the first capability information comprises a multi-tone indication indicating that the terminal device supports multi-tone, wherein the multi-tone indication indicating that the terminal device supports multi-tone is used to allocate a data scheduling resource for a data transmission of the terminal device through a control plane;
receiving the data scheduling resource from the base station; and
sending, on the data scheduling resource, a radio resource control (RRC) connection establishment complete signaling to the base station, wherein the RRC connection establishment complete signaling comprises a non-access stratum (NAS) message, and the NAS message comprises data and NAS signaling sent by the terminal device.

9. The data scheduling method according to claim 8, wherein a moment of sending the first capability information is prior to a moment of sending the RRC connection establishment complete signaling.

10. The data scheduling method according to claim 8, wherein the sending, to the base station, the first capability information of the terminal device comprises:
sending, to the base station, a RRC connection request comprising the first capability information.

11. The data scheduling method according to claim 8, wherein the first capability information comprises at least one of the following information:
a control plane/user plane indication,
a user equipment (UE) category,
a radio capability,
a subscriber profile identifier,
access stratum release information,
a multi-process hybrid automatic repeat request (HARQ) capability,
a large transport block size (TBS) capability,
a new power type,
a mobility enhancement indication,
a control plane re-establishment capability, or
a re-establishment indication.

12. The data scheduling method according to claim 8, wherein the RRC connection establishment complete signaling comprises second capability information of the terminal device, wherein the second capability information comprises a user plane indication.

13. The data scheduling method according to claim 8, wherein the data scheduling method further comprises:
receiving, from the base station, indication information for indicating whether a multi-process HARQ is used in data scheduling.

14. The data scheduling method according to claim 10, wherein the RRC connection request further comprises a system architecture evolution temporary mobile subscriber identity (S-TMSI) of the terminal device.

15. A base station, comprising:
at least one processor; and
one or more memories coupled to the at least one processor and storing programming instructions for execution by the at least one processor to perform the following operations:
receiving first capability information of a terminal device, wherein the first capability information comprises a multi-tone indication indicating that the terminal device supports multi-tone, wherein the multi-tone indication indicating that terminal device supports multi-tone is used to allocate a data scheduling resource for a data transmission of the terminal device through a control plane;
indicating the data scheduling resource to the terminal device; and
receiving, on the data scheduling resource, a radio resource control (RRC) connection establishment complete signaling, wherein the RRC connection establishment complete signaling comprises a non-access stratum (NAS) message, and the NAS message comprises data and NAS signaling sent by the terminal device.

16. The base station according to claim 15, wherein the one or more memories store the programming instructions for execution by the at least one processor to perform the following operation:
receiving, from the terminal device, a RRC connection request comprising the first capability information.

17. The base station according to claim 15, wherein the one or more memories store the programming instructions for execution by the at least one processor to perform the following operations:
receiving, from the terminal device, a RRC connection request comprising a system architecture evolution temporary mobile subscriber identity (S-TMSI) of the terminal device;
determining a core network according to the S-TMSI;
sending a capability information obtaining request to the core network, wherein the capability information obtaining request includes the S-TMSI, and
receiving, from the core network, the first capability information of the terminal device.

18. The base station according to claim 15, wherein the first capability information comprises at least one of the following information:
a control plane/user plane indication,
a user equipment (UE) category,
a radio capability,
a subscriber profile identifier,
access stratum release information,
a multi-process hybrid automatic repeat request (HARQ) capability,
a large transport block size (TBS) capability,
a new power type,
a mobility enhancement indication, a control plane re-establishment capability, or a re-establishment indication.

19. The base station according to claim 15, wherein the RRC connection establishment complete signaling comprises second capability information of the terminal device, wherein the second capability information comprises a user plane indication.

20. The base station according to claim 15, wherein the one or more memories store the programming instructions for execution by the at least one processor to perform the following operations:

sending indication information to the terminal device for indicating whether a multi-process HARQ is used in data scheduling.

21. A communication apparatus, comprising:

at least one processor; and one or more memories coupled to the at least one processor and storing programming instructions for execution by the at least one processor to perform the following operations:

sending, to a base station, first capability information of a terminal device, wherein the first capability information comprises a multi-tone indication indicating that the terminal device supports multi-tone, wherein the multi-tone indication indicating that the terminal device supports multi-tone is used to allocate a data scheduling resource for a data transmission of the terminal device through a control plane;

receiving the data scheduling resource from the base station; and sending, on the data scheduling resource, a radio resource control (RRC) connection establishment complete signaling to the base station, wherein the RRC connection establishment complete signaling comprises a non-access stratum (NAS) message, and the NAS message comprises data and NAS signaling sent by the terminal device.

22. The communication apparatus according to claim 21, wherein the one or more memories store the programming instructions for execution by the at least one processor to perform the following operation:

sending, to the base station, a RRC connection request comprising the first capability information.

23. The communication apparatus according to claim 21, wherein the first capability information comprises at least one of the following information:

a control plane/user plane indication, a user equipment (UE) category, a radio capability, a subscriber profile identifier, access stratum release information, a multi-process hybrid automatic repeat request (HARQ) capability, a large transport block size (TBS) capability, a new power type, a mobility enhancement indication, a control plane re-establishment capability, or a re-establishment indication.

24. The communication apparatus according to claim 21, wherein the RRC connection establishment complete signaling comprises second capability information of the terminal device, wherein the second capability information comprises a user plane indication.

25. The communication apparatus according to claim 21, wherein the one or more memories store the programming instructions for execution by the at least one processor to perform the following operation:

receiving, from the base station, indication information for indicating whether a multi-process HARQ is used in data scheduling.

26. The communication apparatus according to claim 22, wherein the RRC connection request further comprises a system architecture evolution temporary mobile subscriber identity (S-TMSI) of the terminal device.

* * * * *